United States Patent
Lin et al.

(10) Patent No.: US 11,928,304 B2
(45) Date of Patent: Mar. 12, 2024

(54) SMART DIGITAL COMPUTER PLATFORM TO DISPLAY FUGITIVE EMISSIONS OF A FACILITY

(71) Applicant: Molex, LLC, Lisle, IL (US)

(72) Inventors: Ling-Ying Lin, Bloomingdale, IL (US); Alissa Nedossekina, West Lafayette, IN (US); Wenfeng Peng, North Aurora, IL (US); Alexander Chernyshov, Naperville, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/017,417

(22) PCT Filed: Jul. 29, 2021

(86) PCT No.: PCT/IB2021/056932
§ 371 (c)(1),
(2) Date: Jan. 23, 2023

(87) PCT Pub. No.: WO2022/024038
PCT Pub. Date: Feb. 3, 2022

(65) Prior Publication Data
US 2023/0273705 A1    Aug. 31, 2023

Related U.S. Application Data

(60) Provisional application No. 63/059,185, filed on Jul. 31, 2020.

(51) Int. Cl.
*G06F 3/0481* (2022.01)
*G05B 23/02* (2006.01)
(Continued)

(52) U.S. Cl.
CPC ......... *G06F 3/0481* (2013.01); *G05B 23/027* (2013.01); *G06F 3/04847* (2013.01);
(Continued)

(58) Field of Classification Search
CPC .... G06F 3/0481; G06F 3/04847; G06F 9/451; G05B 23/027; G08B 21/12; G06T 2200/24; G06T 11/001
See application file for complete search history.

(56) References Cited

U.S. PATENT DOCUMENTS

2009/0045925 A1* 2/2009 Demin ................. B67D 7/3236
340/12.32
2010/0291850 A1* 11/2010 Sabbaghian .......... B08B 15/002
454/61

(Continued)

FOREIGN PATENT DOCUMENTS

| KR | 101907964 B1 | 10/2018 |
|----|--------------|---------|
| WO | 2018175656 A1 | 9/2018 |
| WO | 2020237112 A1 | 11/2020 |

OTHER PUBLICATIONS

International Preliminary Report on Patentability received for PCT application No. PCT/IB2021/056932, dated Feb. 9, 2023, 9 Pages.

(Continued)

*Primary Examiner* — Tadesse Hailu

(57) ABSTRACT

A smart digital computer platform is disclosed that collects, analyzes, and/or renders appropriate information about fugitive emissions identified by a sensor network-based emissions monitoring system in a facility. More specifically to the methods used by the smart digital computer platform to analyze, filter, and transform the collected monitoring data into a visual output that is capable of being rendered on a graphical user interface (GUI) on a screen display with, in some embodiments, a restricted form factor. For example, smart analytics may be used to cull, filter, and transform the data displayed in a pop-up dialog box on a GUI. In another example, the transformed data may be translated into a (Continued)

visual, graphical element that conveys an abundance of appropriate, tailored information to a particular type of user viewing the GUI.

19 Claims, 12 Drawing Sheets

(51) Int. Cl.
  *G06F 3/04847* (2022.01)
  *G06F 9/451* (2018.01)
  *G06T 11/00* (2006.01)
  *G08B 21/12* (2006.01)

(52) U.S. Cl.
  CPC ............ *G06F 9/451* (2018.02); *G06T 11/001* (2013.01); *G08B 21/12* (2013.01); *G06T 2200/24* (2013.01)

(56) References Cited

U.S. PATENT DOCUMENTS

| | | | |
|---|---|---|---|
| 2011/0185302 A1 | 7/2011 | Kalapodas et al. | |
| 2013/0295837 A1* | 11/2013 | Bailey | F24F 7/003 |
| | | | 454/356 |
| 2014/0252099 A1* | 9/2014 | Hatton | F24F 7/06 |
| | | | 236/44 A |
| 2019/0265123 A1 | 8/2019 | Rieker et al. | |
| 2020/0143659 A1 | 5/2020 | Hummer et al. | |
| 2020/0152040 A1 | 5/2020 | Brown | |

OTHER PUBLICATIONS

International Search Report and Written Opinion received for PCT application No. PCT/IB2021/056932, dated Oct. 28, 2021, 11 Pages.

* cited by examiner

SMART DIGITAL COMPUTER PLATFORM TO DISPLAY FUGITIVE EMISSIONS OF A FACILITY

RELATED APPLICATIONS

This application is a 35 U.S.C. § 371 U.S. National Stage Application of International Application No. PCT/IB2021/056932, filed Jul. 29, 2021, which claims the benefit of priority to U.S. Provisional Patent Application Ser. No. 63/059,185, filed Jul. 31, 2020, and which are herein incorporated by reference in their entireties.

TECHNICAL FIELD

Aspects of the disclosure relate to a smart digital platform that collects, analyzes, and renders appropriate information about fugitive emissions identified by a sensor network-based emissions monitoring system in a facility. More specifically to the methods used by the smart digital platform to analyze, filter, and transform the collected monitoring data into a visual output that is capable of being rendered on a graphical user interface (GUI) on a screen display with, in some embodiments, a restricted form factor. For example, smart analytics may be used to cull, filter, and transform the data displayed in a pop-up dialog box on a GUI. In another example, the transformed data may be translated into a visual, graphical element that conveys an abundance of appropriate, tailored information to a particular type of user viewing the GUI.

In addition, a centerpiece of the platform design is potential source locations (PSLs) of leaks (that are generated by one or more algorithms running in the background) disclosed herein and displayed on the sitemap. In contrast to EPA Method 21, where components are inspected on a predetermined schedule, a sensor detection notification with a PSL better informs/alerts when there are significant leaks in a plant, and specifically where to inspect for those leaks. The smart digital platform may manage and visualize activities before, during, and after leak investigations associated with these PSLs.

DESCRIPTION OF RELATED ART

Volatile organic compounds ("VOCs") and hazardous air pollutants ("HAPs") can be emitted from a variety of sources in industrial facilities such as stacks, tanks, vents, and other sources as part of normal operations, and valve packing, pump seals, compressor seals, and flange gaskets as potential leak interfaces on process equipment and components. There are numerous federal, state, and local regulations designed to control fugitive emissions from industrial sources through leak detection and repair ("LDAR") work practices, which are designed to identify leaking equipment so that emissions of VOCs and HAPs can be reduced through effective repairs. Although the detailed compliance requirements can be quite complex, each LDAR regulation is essentially a variation on the theme of monitoring components to find fugitive leaks, repairing and re-monitoring those leaks in a specified time frame, and maintaining the records necessary to demonstrate compliance. Leak detection is performed by periodically monitoring each component in light liquid or gas vapor VOC service per 40 CFR Part 60 Appendix A-7, Test Method 21 ("EPA Method 21"). If the measured value (typically in parts per million (ppm) by volume) exceeds the regulatory leak definition, a leak is detected. Large complex refineries and chemical facilities may be required to monitor hundreds of thousands of components each year to identify the 1-2% of the component population that are leaking.

In execution of EPA Method 21, an inspector places an extractive hand-held probe in direct contact with the component under test and traces its circumference, waiting an appropriate amount of time to register a reading of leak rate typically represented by gas concentration in ppm (mixing ratio of combustible fraction). If the highest concentration reading is above a control limit, typically 500 to 2000 ppm, then the component is tagged for repair. The EPA Method 21-determined concentrations are sometimes used to approximate mass flow rates through correlation equations to estimate annual emission leak rates for the facility—a procedure with several sources of uncertainty. It is well known that manual leak detection methods to monitor and repair sources of fugitive emissions are resource intensive and difficult to apply on hard-to-reach sources. Additionally, EPA Method 21 is expensive to execute and can produce safety concerns for inspectors. This manual inspection procedure only checks a subset of potential emissions points inside a facility and possesses high temporal latency since some components may not be visited for more than a year, creating the potential for a leak to go undetected for an extended time. On the other hand, manual placement and testing of sensors can be very costly, time consuming, and technically challenging. It may require months and several visits to the plant by experienced and/or trained personnel. Moreover, each facility/plant may have a different layout and product streams, and there are many critical parameters to consider.

In addition, artificial intelligence (AI) is of increasing interest in fields where significant human time and subjective decision-making is otherwise necessary. AI also has benefits beyond programming efficiency: machines may also learn and identify correlations in data that would otherwise go undetected if reviewed by humans. While a human would be unlikely to detect a correlation given the volume of data involved and a lack of a motivation to compare such datasets, a machine learning AI algorithm may do so largely without human intervention.

As a result of the foregoing, one or more improvements upon the various shortcomings in the prior art are desired. There remain unfulfilled aspects in the art for clear visualization of how all of the information that is going on behind the scenes (e.g., sensor data, algorithms, etc.) is being depicted in an easy to view/understand matter on an electronic display screen. Manual analysis and presentation of data placement and testing of sensors can be costly, time consuming, and technically challenging. It may require continuous custody months and several visits to the plant by experienced and/or trained personnel. Moreover, AI, such as machine learning, is still nascent in many fields, and the integration of its capabilities still leaves much room for improvement.

SUMMARY

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

Implementations may include one or more of the following features. The non-transitory computer-readable medium as claimed in any one further storing computer-executable instructions that, when executed by the processor, cause the system to perform a method comprising: generating a visual representation of a physical facility comprising one or more potential source locations (PSLs) (of leak) and one or more physical sensors; determining one or more characteristics of the one or more PSLs and the one or more physical sensors; retrieving, from the one or more PSLs and the one or more sensors, a level of leak detection; associating the level of leak detection with a visual representation indicative of the level of leak detection; configuring an interactive graphical user interface that may provide the site map; and based on a user selection of filters associated with the one or more characteristics of the one or more PSLs and the one or more physical sensors, causing the graphical user interface to display the information based on the selected filters. Implementations of the described techniques may include hardware, a method or process, or computer software on a computer-accessible medium.

BRIEF DESCRIPTION OF THE DRAWINGS

The present disclosure is illustrated by way of example and not limited in the accompanying figures in which like reference numerals indicate similar elements and in which.

Figure 1:
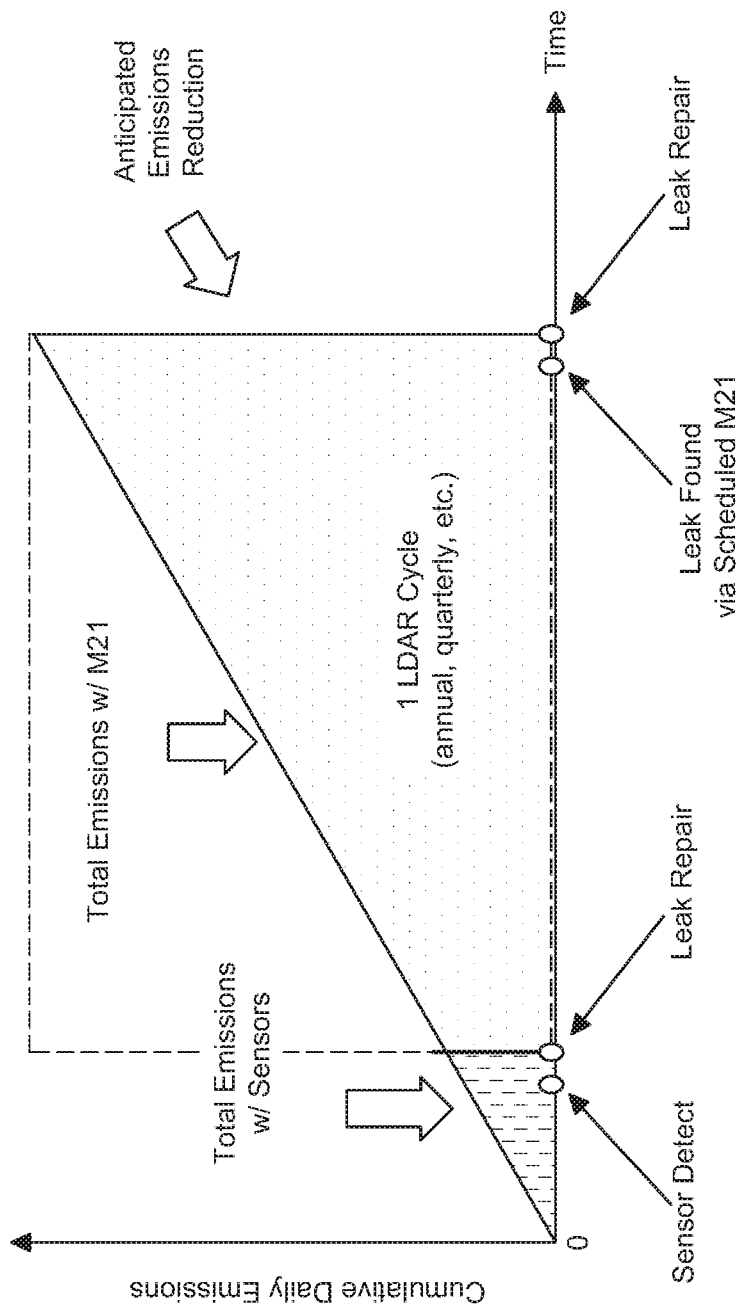
FIG. 1 is a chart illustrating reductions in total emissions by detecting large leaks earlier, in accordance with various aspects of the disclosure.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

DETAILED DESCRIPTION

This disclosure describes numerous embodiments involving a smart digital platform that collects, analyzes, and/or renders appropriate information about fugitive emissions identified by a sensor network-based emissions monitoring system in a facility. The smart digital platform outputs to a graphical user interface (GUI) on a screen display. More specifically to the methods used by the smart digital platform to analyze, filter, and transform the collected monitoring data into a visual output that is capable of being rendered on a graphical user interface (GUI) on a screen display with, in some embodiments, a restricted form factor. For example, smart analytics may be used to cull, filter, and transform the data displayed in a pop-up dialog box on a GUI. In another example, the transformed data may be translated into a visual, graphical element that conveys an abundance of appropriate, tailored information to a particular type of user viewing the GUI.

Other embodiments are also disclosed herein involving derivations and combinations of the various method steps and system components disclosed herein. While the disclosure may be susceptible to embodiment in different forms, there is shown in the drawings, and herein will be described in detail, specific embodiments with the understanding that the present disclosure is to be considered an exemplification of the principles of the disclosure and is not intended to limit the disclosure to that as illustrated and described herein. Therefore, unless otherwise noted, features disclosed herein may be combined to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

In one example, a remote alert device may comprise a processor, a memory, and/or a communication interface. The processor may process and analyze the data stored in the memory. In some embodiments, the memory may store computer-executable instructions that, when executed by the processor, cause a remote alert device to perform one or more of the steps disclosed herein. In some embodiments, the system may generate alerts based on values received through the communications interface. The values may indicate that a dangerous gas leak has been detected in the facility due to anomalous sensor readings, thus causing adjustment of one or more operating parameters of the facility. As explained above, in one example, the remote alert device may display a graphical user interface (GUI) to a user of the device to enable the user to enter desired parameters and/or commands. As a result of adjustment of the operating parameters, the facility may cause adjustments or halting/starting of one or more operations. In an alternative embodiment, the commands may be directly communicated, either wirelessly or in a wired fashion, to physical components at the facility such that the physical components include an interface to receive the commands and execute them.

In some embodiments the remote alert device may include a desktop computer, a smartphone, a wireless device, a tablet computer, a laptop computer, and/or the like. The remote alert device may be physically located locally or remotely, and may be connected by one of communications links.

FIG. 1 illustrates that emissions of air pollutants may be reduced if unanticipated emissions that require mitigation can be detected and fixed in a timely manner. From the shared perspective of industrial facilities, workers, regulators, and nearby communities, cost-effective detection and management of fugitive emissions (leaks) is a mutually beneficial concept. In addition to reducing emissions, the disclosure contemplates safer working environments, reduced resource waste through more efficient work practices and by minimizing/reducing product loss, and improved emissions inventory knowledge and communications with regulators and communities.

Figure 2:
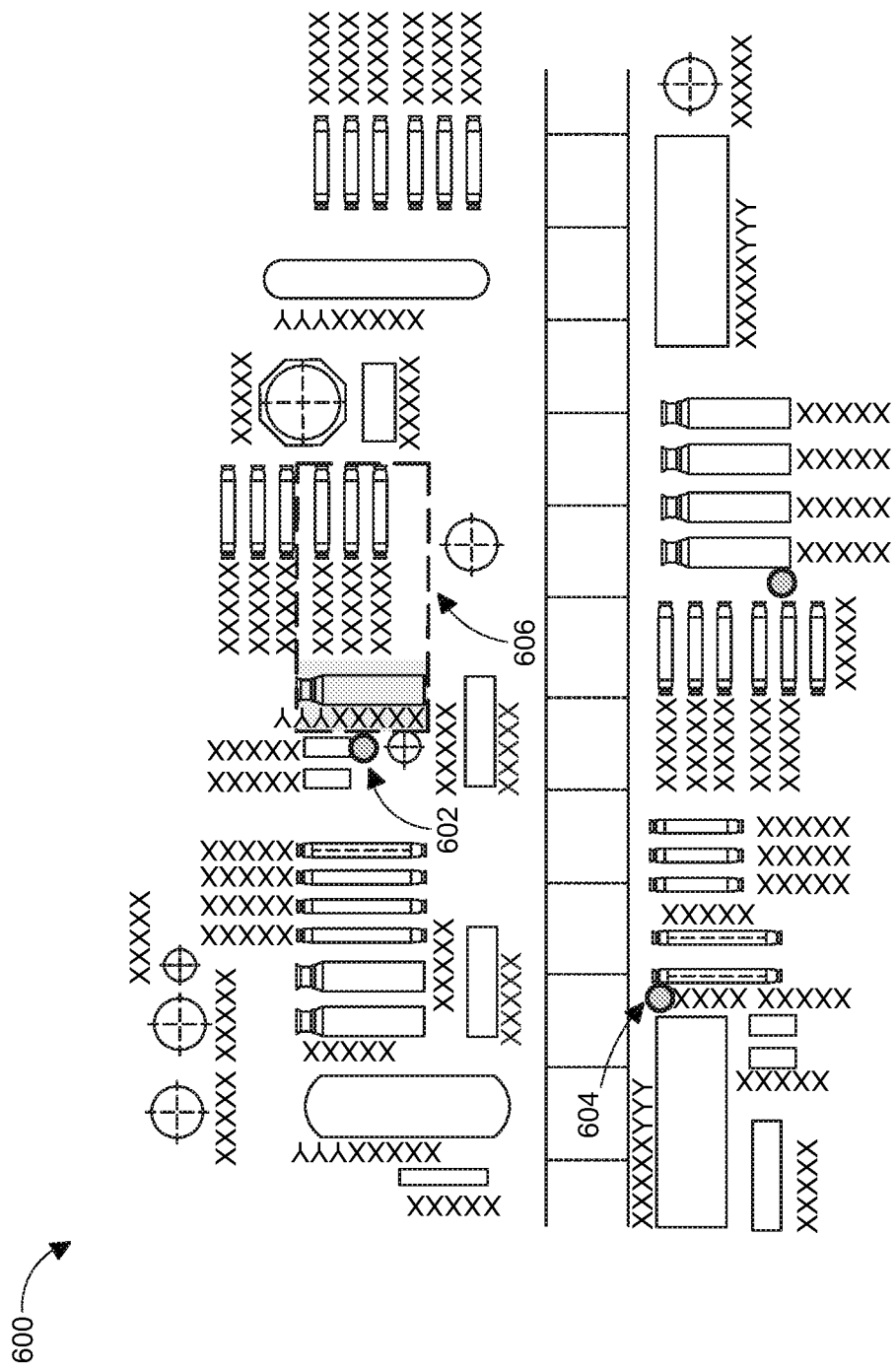
FIG. 2 illustrates an example embodiment of sensor placement within a facility to detect fugitive emissions within the facility.

FIG. 2 illustrates an example embodiment of sensor placement within a facility to detect fugitive emissions within the facility. Referring to FIG. 2, a site map 600 of a facility is shown, with a schematic arrangement of a plurality of PSL sensors placed at the facility and a potential source location ("PSL") generated by the system. For example, a first shape (e.g., a first circle) representing a first sensor 602, and a second shape (e.g., a second circle) representing a second sensor 604, are shown. Also, for example, a third shape (e.g., a rectangular bounding box with a dashed boundary) representing PSL 606 is shown. In some aspects, a PSL may be represented as a rectangular bounding box with a solid boundary. The location of first sensor 602, second sensor 604 and PSL 606 on the site map 600 correspond to a physical location of the respective sensors and PSLs at the facility represented by the site map 600.

As described herein, the first circle representing the first sensor 602, and the second circle representing the second sensor 604, may be filled in with one or more colors indicative of a severity level of a leak detected by the sensor at the physical facility. As another example, the rectangular bounding box representing PSL 606, may be completely or partially filled in with one or more colors to highlight a PSL and/or a specific area and/or equipment within the PSL that may be a source of the leak. Accordingly, personnel viewing the site map 600 may be able to locate a possible leak source by identifying the equipment in the PSL with ease and accuracy. In some examples, one or more colors may be represented by a varying gradient of the same color to designate different colors. In yet another example, one or more colors may be represented by a cross-hatching or design being overlaid inside of the circle, rather than different colors.

Although a circular shape is used to represent a sensor, and a rectangular shape is used to represent a PSL, any geometric shape may be utilized. Also, for example, although colors are used to illustrate a simplified visualization of potential leaks, severity levels, and so forth, additional and/or alternative visual indications may be utilized.

Figure 3:
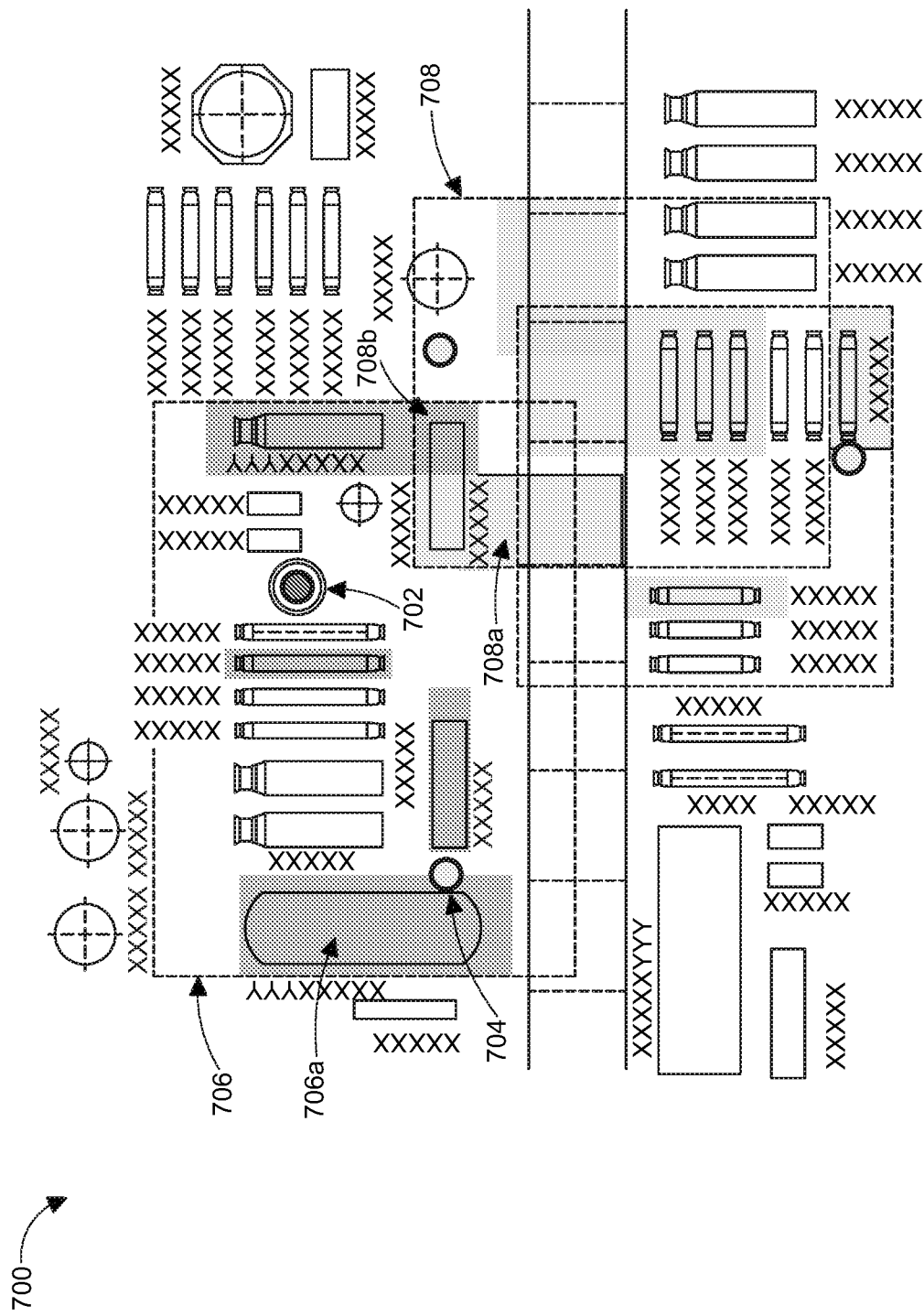
FIG. 3 illustrates an example embodiment of a visualization of a potential source location ("PSL") of leaks based on sensor placement within a facility.

FIG. 3 illustrates an example embodiment of a visualization of a potential leak source location based on sensor placement within a facility. Referring to FIG. 3, a detection category indicative of a level of severity detected by one or more sensors may be represented by a color of the PSL. For example, PSL 706 may include a sub-region 706a indicative of a location of a possible/probable leak source within PSL 706. In some embodiments, a severity of a potential leak at a sub-region and/or equipment may be indicated by a color scheme. For example, a first color (e.g., red), may be indicative of a high detection, a second color (e.g., orange), may be indicative of a medium detection, and a third color (e.g., yellow), may be indicative of a low detection. Additional and/or alternative colors may be utilized to depict detection levels. In some embodiments, a detection level may be represented by ascending (or descending) numerals, such as, for example, "1" for low detection, "2" for medium detection, "3" for high detection, "4" for extremely high detection, and so forth. In yet another example, a detection level may be represented by a numeral, such as, "3" for low detection, "2" for medium detection, "1" for high detection, and so forth. Other variations of the aforementioned representations of detection levels are contemplated by this disclosure.

In some embodiments, PSLs may be illustrated with the same color with increasing darkness for increasing detection strengths. For example, a darker shade of red may be indicative of a higher detection level than detection level represented by the color red. As another example, a lighter shade of orange may be indicative of a detection level between low (e.g., represented by the color yellow) and medium (e.g., represented by the color orange).

In some embodiments, a circle representing a sensor may be filled in with a color indicative of a strength of detection of a leak by that sensor. For example, a first circle 704 representing first sensor in PSL 706 may be filled in with color yellow indicative of a low level of leak detection. Also, for example, a second circle 702 representing second sensor in PSL 706 may be filled in with color red indicative of a high level of leak detection. In some embodiments, the second circle 702 representing the second sensor in PSL 706 may be filled in with a darker shade of color red indicative of a very high level of leak detection.

In some embodiments, follow up investigation may be prioritized according to detection categories, with a highest detection PSL given a high priority. For example, a detection level may be associated with a level of response. A higher detection level (e.g., indicated by a darker shade of red) may be prioritized as a very high priority investigation. For example, upon a determination that a PSL is indicated with a dark shade of red, appropriate personnel may be alerted, and timely investigation at the physical facility may be performed to avert, and/or mitigate damage from a leak. As another example, a lower detection level (e.g., indicated by a lighter shade of yellow) may be prioritized as a very low priority investigation.

Generally, conventional methods of leak location rely on a probabilistic visualization, such as, for example, a heat-map, where a sequential, and/or diverging color scale may represent a probability of leak source location. As described herein, site map 700 may directly help in locating a PSL with a high degree of accuracy, thereby minimizing, and/or eliminating a risk of inaccurate alerts. Also, for example, by pin-pointing a PSL, and/or a detection level, with a high degree of accuracy may enable shorter response times, and more effective safety protocols. Also, for example, visual representation of a leak detection strength (e.g., with a color scheme) allows for effective prioritization of investigations, and resulting in shorter response times, ability to carry appropriate equipment (concomitant to the level of leak detection), appropriate personnel, and so forth. For example, if a type of unit, and/or a type of equipment, that may be a potential source of leak is known, appropriate resources may be deployed and/or allocated. Also, for example, an appropriate number of personnel may be deployed. In some embodiments, and appropriate level of evacuation may be performed. For example, a higher detection level may be associated with a larger evacuation area, and a lower detection level may be associated with a smaller evacuation area.

An overlap of areas from adjacent PSLs results in a darker color, which may be indicative of a higher probability of leaks in that area. For example, PSL 708 may include a first region 708*a* that may be associated with one color (e.g., yellow) indicating a low level of leak detection. Also, for example, PSL 708 may include a second region 708*b* that may be associated with a darker color indicating an overlap of the yellow-colored region indicating a low level of leak detection, and another colored (e.g., orange-colored) region indicating a medium level of leak detection. Accordingly, second region 708*b* may be indicative of a higher probability of leaks when compared to the first region 708*a*.

As described herein, site map 700 may indicate physical locations of facility equipment, and may indicate, with a high degree of precision, the equipment that may be a potential leak source at a facility represented by site map 700. Accordingly, this may significantly reduce a search area and/or time to search, respond, and so forth. Also, as described herein, a simplified visualization of a possible leak source location, a level of leak detection, and so forth, may reflect an up-to-date, real-time, or near real time leak location distribution and/or detection strength. For example, PSLs updated in real-time may be supported by a smart digital platform that includes one and/or more of: hardware sensors constantly monitored 24/7 in the field; stable software infrastructure; software algorithm constantly executed in 24/7 automatically; and/or wherein the data detected from the device sensors is processed and/or analyzed by one or more algorithms/models to indicate the latest status of leak distribution and detection strength.

The digital platform system consists of networked sensors and a gateway that may include an edge computer with backup storage. Sensor output data can be processed locally on the edge computer, or it can be transmitted to the cloud directly for processing and analytics, or a combination thereof. The choice between local and/or central processing may be determined by the availability of local computational power, the bandwidth communication between the site and the cloud, and/or other criteria. A combination of two or more methods may also be used. In one example, partial processing can be carried out on the edge computer and additional processing and analytics carried out in the cloud. In the local processing, sensor data can be filtered, aggregated, compressed and then sent to the cloud via a gateway at a lowered frequency than the actual sampling rate of the sensors.

Figure 4:
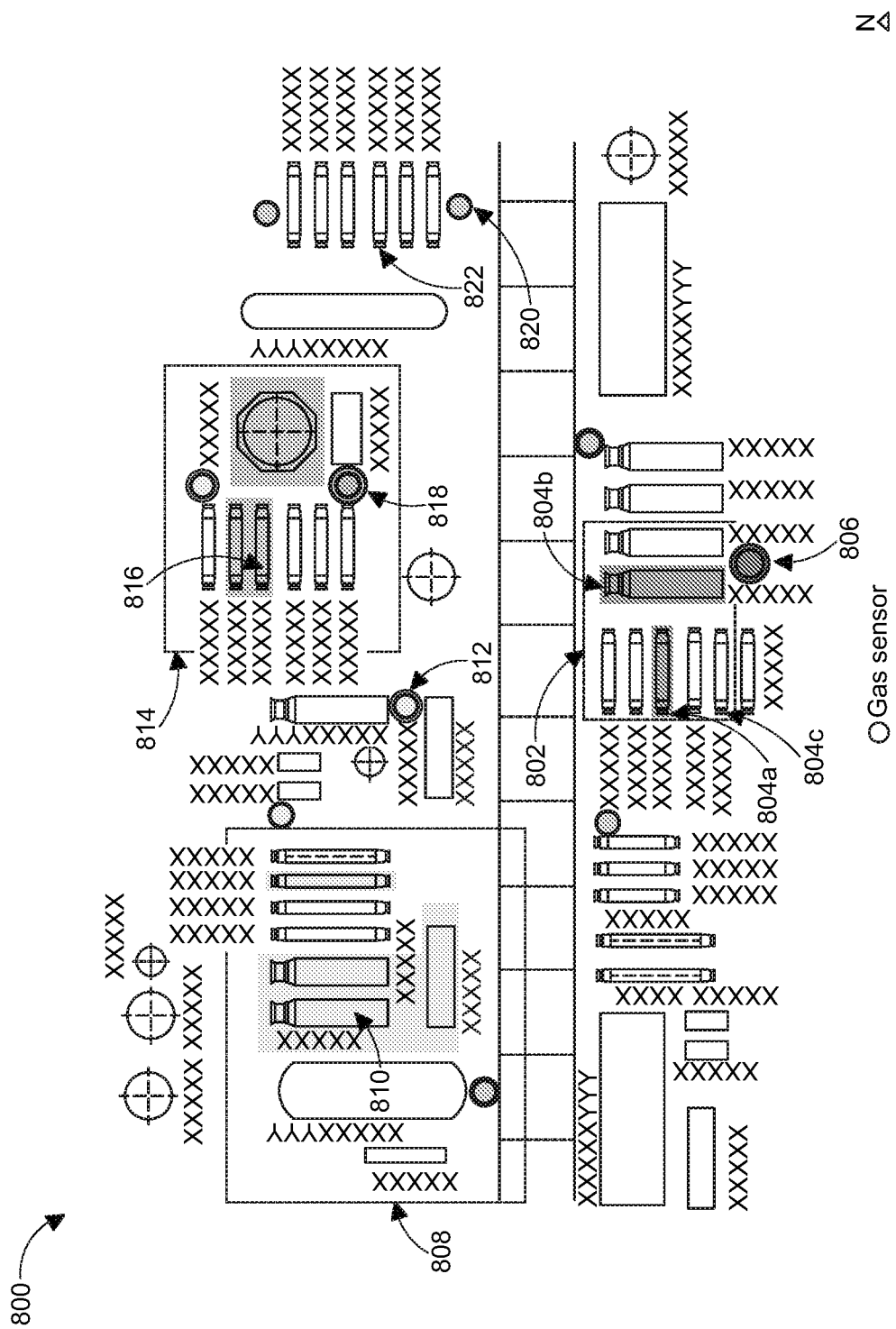
FIG. 4 illustrates another example embodiment of a visualization of a PSL based on sensor placement within a facility.

FIG. 4 illustrates another example embodiment of a visualization of a potential leak source location based on sensor placement within a facility. Referring to FIG. 4, the visualization of the PSL location based on sensor placement may be displayed on top of an industrial facility site map 800. In some embodiments, as described herein, a qualitative color palette (e.g., a lighter shade of yellow, a darker shade of red, and so forth) may be utilized to express leak detection strength categories. Also, for example, follow-up leak investigations may be prioritized according to detection strength categories.

In some embodiments, circles representing sensors may be color coded to provide a fast and reliable means of representing detection levels. For example, a first sensor 806 may be colored in a first color (e.g., red) indictive of an extremely high level of leak detection. As another example, a second sensor 812 may be colored in a second color (e.g., yellow) indictive of a low level of leak detection. Also, for example, a third sensor 818 may be colored in a third color (e.g., orange) indictive of a medium level of leak detection. As another example, a fourth sensor 820 may be colored in a fourth color (e.g., blue) indictive of a very low level of leak detection, and/or no detection of a leak.

In some embodiments, a plurality of concentric circles may be utilized to illustrate sensor detection counts. For example, a higher number of concentric circles may be indicative of higher detection counts. For example, a circle with three (3) concentric rings may be indicative of a sensor with a higher detection count, and a circle with one (1) concentric ring may be indicative of a sensor with a lower detection count.

Also, for example, a first PSL 802 may include a first equipment 804*a* and a second equipment 804*b* that may be represented with a red color, indicative of a high level of leak detection. Also, for example, third equipment 804*c* may be represented with no color, indicating that no leak is detected (given the properties or characteristics of the component, for example, this component may contain just water and is not possible to leak gas from it). As illustrated, a location of first equipment 804*a* and second equipment 804*b* within first PSL 802 is shown, along with their placements with respect to other equipment in first PSL 802.

As another example, a second PSL 808 may include fourth equipment 810, that may be represented with a yellow color, indicative of a low level of leak detection. As illustrated, a location of fourth equipment 810 within second PSL 808 is shown, along with their placements with respect to other equipment in second PSL 808. Also, for example, a third PSL 814 may include fifth equipment 816, that may be represented with an orange color, indicative of a medium level of leak detection. As illustrated, a location of fifth equipment 816 within third PSL 814 is shown, along with their placements with respect to other equipment in second third PSL 814.

As another example, a sixth equipment 822 may be represented with no color, thereby indicating that sixth equipment 822 is not a source of a leak. This may be consistent with, for example, the fourth sensor 820, colored in the fourth color (e.g., blue) indictive of a very low level of leak detection, and/or no detection of a leak. As may be noted, such an accuracy of location of sensors, equipment, and/or a simplified visualization of respective levels of leak detection may be an efficient aid to faster and more reliable generation of alert notifications, investigations, responses to potential threats, and so forth.

Figure 5:
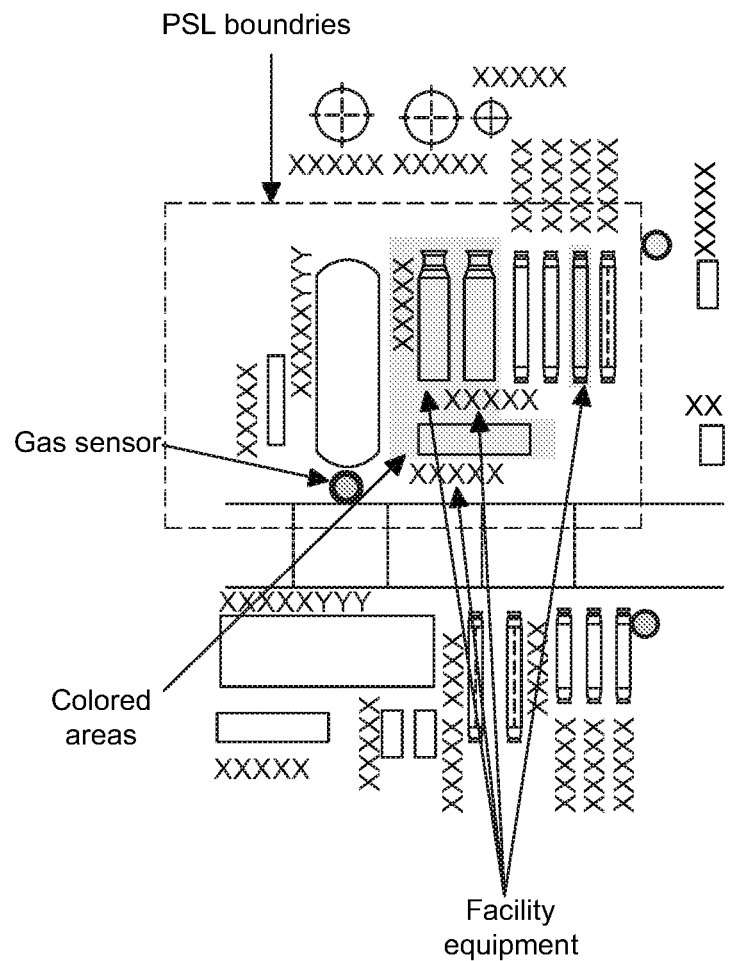
FIG. 5 illustrates another example embodiment of a visualization of a PSL based on sensor placement within a facility.

FIG. 5 illustrates another example embodiment of a visualization of a potential leak source location based on sensor placement within a facility. Referring to FIG. 5, a solid/dashed line may represent "PSL boundaries". Also, for example, "colored areas" (e.g., yellow colored areas) within the "PSL boundaries" may indicate specific "facility equipment" having potential leak sources with a high detection confidence. Accordingly, a leak-investigation team may focus search efforts within/around the "colored areas" first, enabling a reduction in search time. In some embodiments, non-colored areas within the "PSL boundaries" may provide a secondary option for a search if a leak source is not found within the "colored areas".

Figure 6:
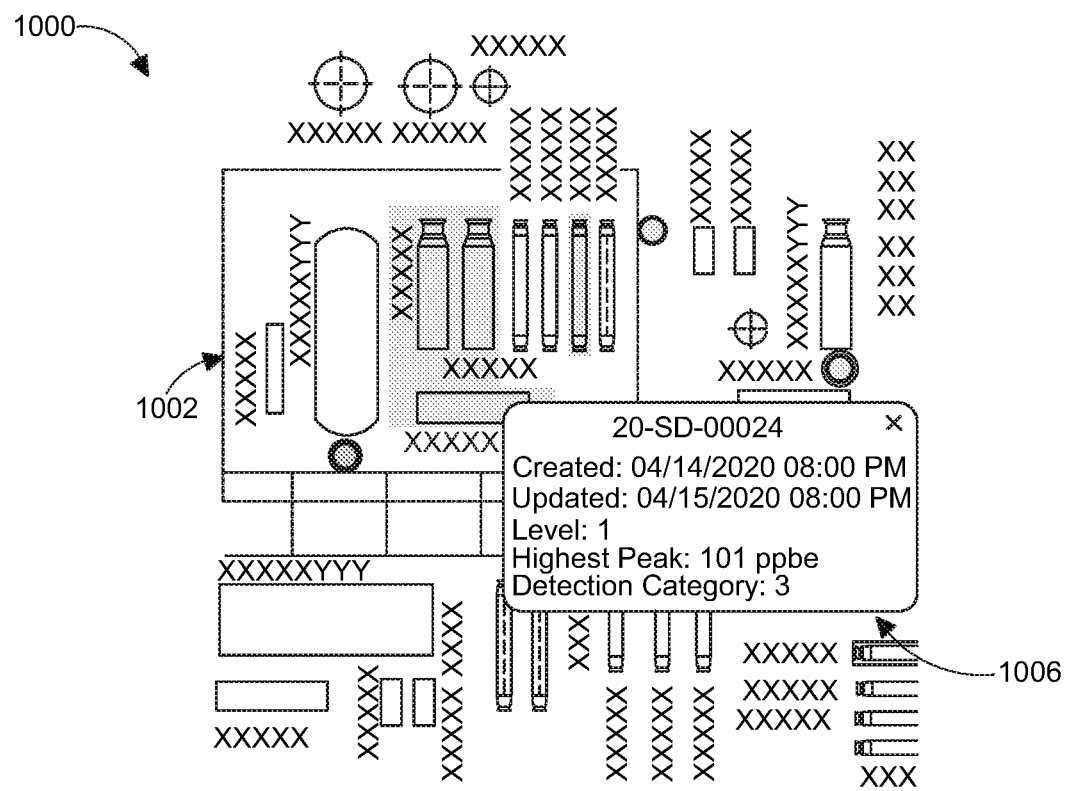
FIG. 6 illustrates an example embodiment of a graphical user interface to provide a notification label indicative of sensor data from a PSL.

FIG. 6 illustrates an example embodiment of a graphical user interface 1000 to provide a notification label 1006 indicative of sensor data from a potential leak source.

Referring to FIG. 6, information and/or data associated with a PSL or a sensor may be provided via a graphical user interface ("GUI") 1000. In some embodiments, GUI 1000 may be an interactive GUI 1000, configured to detect user interaction with visual objects displayed via GUI 1000, and provide appropriate responses to user queries. In some embodiments, the information and/or data associated with an equipment and/or a sensor may be refined and/or updated. Along with the PSL visualization, as described herein, detailed information and/or data associated with a PSL may be provided. For example, GUI 1000 may be an interactive screen (touch-sensitive or other), and by user selection (e.g., a mouse hover, a click, a finger touch, hovering over the PSL 1002 of the screen with a pointing device (e.g., a finger, a stylus), a touching of the display device displaying the GUI 1000, and so forth), then a notification label 1006 may be displayed.

For example, in response to a detection notification with PSL 1002, notification label 1006 may be provided/displayed on GUI 1000. Notification label 1006 may include information such as, for example, a date and/or time when the notification label 1006 was created, a date and/or time when the information and/or data in notification label 1006 was last updated, an elevation level of possible leak location at PSL 1002, a highest detection peak associated with PSL 1002, and a leak detection category associated with PSL 1002. In some examples, the notification label 1006 may also include any of the following information/data: leak label, PSL created date, date of the latest PSL update, highest detection peak associated with the PSL notification, leak detection category, elevation level, unit/site name, size and position of PSL boundaries, number of colored equipment within PSL boundaries, colored equipment names within PSL boundaries, equipment with the highest detection probability, wind magnitude around the PSL within the latest pre-determined number of hours, wind direction around the PSL within the latest pre-determined number of hours, number of leaks found around the PSL, date of leak(s) found, and/or other information/data.

Notification label 1006 may be automatically updated periodically (e.g., weekly, daily, hourly, or other interval of time) or in near real-time. Generally, an updated PSL information may reflect up-to-date actual leak numbers, PSL locations and leak detection strengths. In some embodiments, the notification label 1006 may be automatically updated with an up-to-date gas sensor data, and/or an up-to-date wind sensor data. Frequency of an update may be based on one or more factors, such as, for example, a type of facility, a type of equipment, an age of the facility and/or the equipment, a leak detection strength at the time of the last update, and so forth. In some embodiments, the notification label 1006 may be automatically updated with a size and/or position of PSL boundaries, a number, size and/or position of colored areas within PSL boundaries, a level of leak detection associated with an equipment and/or sensor in the PSL, and so forth. In another example, the notification label 1006 may be updated in near real-time to account for updates in the underlying digital representation of the facility stored in a data store. Alternatively, the notification label 1006 may be updated based on measurements made in near real-time at the facility and/or environmental variables (e.g., current meteorological condition, wind speed, wind direction, temperature, and others) at the facility.

The GUI 1000 may provide a communication interface on which an input may be provided to a computer (e.g., remote device) in a computer system environment. The GUI 1000 may further enable textual, audiovisual, and/or graphical input and/or output. The data displayed on the GUI 1000 may be identified, selected, and tailored by computer-executable instructions executing on the aforementioned computer. Generally, an equipment and/or sensor may be associated with a lot of data. However, presenting such a large amount of data in a visually simplified manner on a GUI 1000 on a screen display with a small form factor may be a challenging task. Notification label 1006 may be automatically updated in near real-time, in some embodiments, based on one or more rules executing on the computer. The rules may be stored in the computer-executable instructions such that the appropriate equipment and/or sensor data is rendered in the notification label 1006 when it is triggered for display.

In another example, the GUI 1000 may provide both an output and input into the underlying equipment and/or sensors displayed on the GUI 1000. For example, the GUI 1000 may be communicatively coupled to a controller that is configured to actuate one or more tangible components in the facility. For example, the controller may actuate a valve component from an open position to a closed position, and vice versa. The components may be transporting gaseous materials across a distance in the facility, and when a leak source is detected, the GUI 1000 may be used to interactively and visually issue a command to actuate the valve component into a closed position, thus shutting off the flow of gas to the component with the source of the leak.

In another embodiment, GUI 1000 may be configured based on an advanced computational algorithm/model that may be trained to identify, select, then summarize available information and data, and present the information in a visually simplified manner for accurate, fast, and reliable observations by personnel. Rather than predefined rules stored in the computer-executable instructions of the computer, the GUI 1000 may operate based on dynamic learning achieved through the machine learning model. For example, a machine learning model may be utilized to summarize the information based on a type of user interacting with GUI 1000. Also, for example, a machine learning model may be used to determine a type of detail that may be provided. As another example, a machine learning model may be trained to detect correlations between types of queries that a user may typically input, the user, facility, equipment, sensor, and so forth, and the machine learning model may be trained to provide appropriate responses, via notification label 1006.

The system may, in some examples, be programmed with artificial intelligence (AI). The AI may be executed on one or more artificial neural networks in accordance with various aspects of the disclosure described herein. By way of background overview, a framework for AI (advanced computational algorithm and/or machine learning algorithm) may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning AI functionality.

AI sometimes rely on unique computing system structures. AI may leverage neural networks, which are systems that approximate biological neural networks (e.g., the human brain). Such structures, while significantly more complex than conventional computer systems, are beneficial in implementing AI. For example, an artificial neural network may be comprised of a large set of nodes which, like neurons in the brain, may be dynamically configured to effectuate learning and decision-making.

AI tasks are sometimes broadly categorized as either unsupervised learning or supervised learning. In unsupervised learning, AI is left to generate any output (e.g., to label as desired) without feedback. The AI may teach itself (e.g., observe past output), but otherwise operates without (or mostly without) feedback from, for example, a human administrator. Meanwhile, in supervised learning, AI is provided feedback on its output. Feedback may be provided in a variety of ways, including via active learning, semi-supervised learning, and/or reinforcement learning. In active learning, AI is allowed to query answers from an administrator. In semi-supervised learning, AI is provided a set of example labels along with unlabeled data. In reinforcement learning, AI is rewarded for correct labels, allowing it to iteratively observe conditions until rewards are consistently earned.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, AI systems and their underlying components may be tuned by data scientists to perform numerous steps to perfect AI systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals clearer, given the nearly infinite number of variables that can possibly be optimized in the AI system. Meanwhile, one or more of data integration, selection, cleaning, and/or pre-processing steps can sometimes be the most time consuming because the old adage, "garbage in, garbage out," also reigns true in AI systems.

Once data for AI has been created, an optimization process may be used to transform the AI model. The optimization process may include (1) training the data to predict an outcome, (2) defining a loss function that serves as an accurate measure to evaluate the AI model's performance, (3) minimizing the loss function, such as through a gradient descent algorithm or other algorithms, and/or (4) optimizing a sampling method, such as using a stochastic gradient descent (SGD) method where instead of feeding an entire dataset to the AI for the computation of each step, a subset of data is sampled sequentially.

In one example, an artificial neural network may execute a machine learning algorithm using nonlinear processing or forms of nonlinear processing, in accordance with features described herein.

In one illustrative method using a feedback system of an artificial neural network, the system may use machine learning to determine an output. The output may include a leak area boundary, confidence values, and/or classification output. The system may use an appropriate machine learning model including xg-boosted decision trees, auto-encoders, perceptron, decision trees, support vector machines, regression, and/or a neural network. The neural network may be an appropriate type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting— regularization (such as L1 or L2), dropout, and/or other techniques. The neural network may also increase the amount of training data used to prevent overfitting.

In one example, the nodes in an artificial neural network may perform various types of processing, such as discrete computations, computer programs, and/or mathematical functions implemented by a computing device. For example, the input nodes into the artificial neural network may comprise logical inputs of different data sources, such as one or more data servers. The processing nodes of the artificial neural network may comprise parallel processes executing on multiple servers in a data center. And, the output nodes of the artificial neural network may be the logical outputs that ultimately are stored in results data stores, such as the same or different data servers as for the input nodes. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network may learn and/or be dynamically reconfigured. Though nodes are depicted as having connections only to successive nodes in the artificial neural network, connections may be formed between any nodes. For example, one processing node may be configured to send output to a previous processing node.

The artificial neural network may be configured to effectuate decision-making. Multiple data sets may further refine the decision-making, each looking for further specific tasks, with each node performing some form of processing which need not necessarily operate in the furtherance of that task. The artificial neural network may then make a prediction. The prediction may be correct or incorrect.

The feedback system may be configured to determine whether the artificial neural network made a correct decision. Feedback may comprise an indication of a correct answer and/or an indication of an incorrect answer and/or a degree of correctness (e.g., a percentage). For example, the feedback system may be configured to determine if the prediction was correct and, if so, what percentage of the decision was correct. The feedback system may already know a correct answer, such that the feedback system may train the artificial neural network by indicating whether it made a correct decision. The feedback system may comprise human input, such as an administrator telling the artificial neural network whether it made a correct decision. The feedback system may provide feedback (e.g., an indication of whether the previous output was correct or incorrect) to the artificial neural network via input nodes or may transmit such information to one or more nodes. The feedback system may additionally or alternatively be coupled to a storage such that output is stored. The feedback system may not have correct answers at all, but instead base feedback on further processing.

The artificial neural network may be dynamically modified to learn and provide better input. Based on, for example, previous input and output and feedback from the feedback system, the artificial neural network may modify itself. For example, processing in nodes may change and/or connections may be weighted differently. The modifications may be predictions and/or guesses by the artificial neural network, such that the artificial neural network may vary its nodes and connections to test hypotheses.

The artificial neural network need not have a set number of processing nodes or number of sets of processing nodes, but may increase or decrease its complexity. For example, the artificial neural network may determine that one or more processing nodes are unnecessary or should be repurposed, and either discard or reconfigure the processing nodes on that basis. As another example, the artificial neural network may determine that further processing of all or part of the input is required and add additional processing nodes and/or sets of processing nodes on that basis.

The feedback provided by the feedback system may be mere reinforcement (e.g., providing an indication that output is correct or incorrect, awarding the machine learning algorithm a number of points, or the like) or may be specific (e.g., providing the correct output).

The artificial neural network may be supported or replaced by other forms of machine learning. For example, one or more of the nodes of artificial neural network may implement a decision tree, associational rule set, logic programming, regression model, cluster analysis mechanisms, Bayesian network, propositional formulae, generative models, and/or other algorithms or forms of decision-making. The artificial neural network may effectuate deep learning.

Although several embodiments in this application describe an array of networked sensors, in some embodiments the system may operate with non-networked sensors that operates individually without an array configuration of sensors. In such an embodiment, the single sensor may use artificial intelligence, such as machine learning or Bayesian techniques, with a feedback loop to improve the sensors' accuracy and/or precision over time. In other words, the system may use artificial intelligence, such as supervised and unsupervised machine learning and Bayesian techniques, as described herein, to better predict the boundary of a leak. In addition to measured values from automated means, the system may, in some examples, incorporate expert human input that validates or invalidates the boundary predictions generated by the emissions monitoring apparatus.

Figure 7:
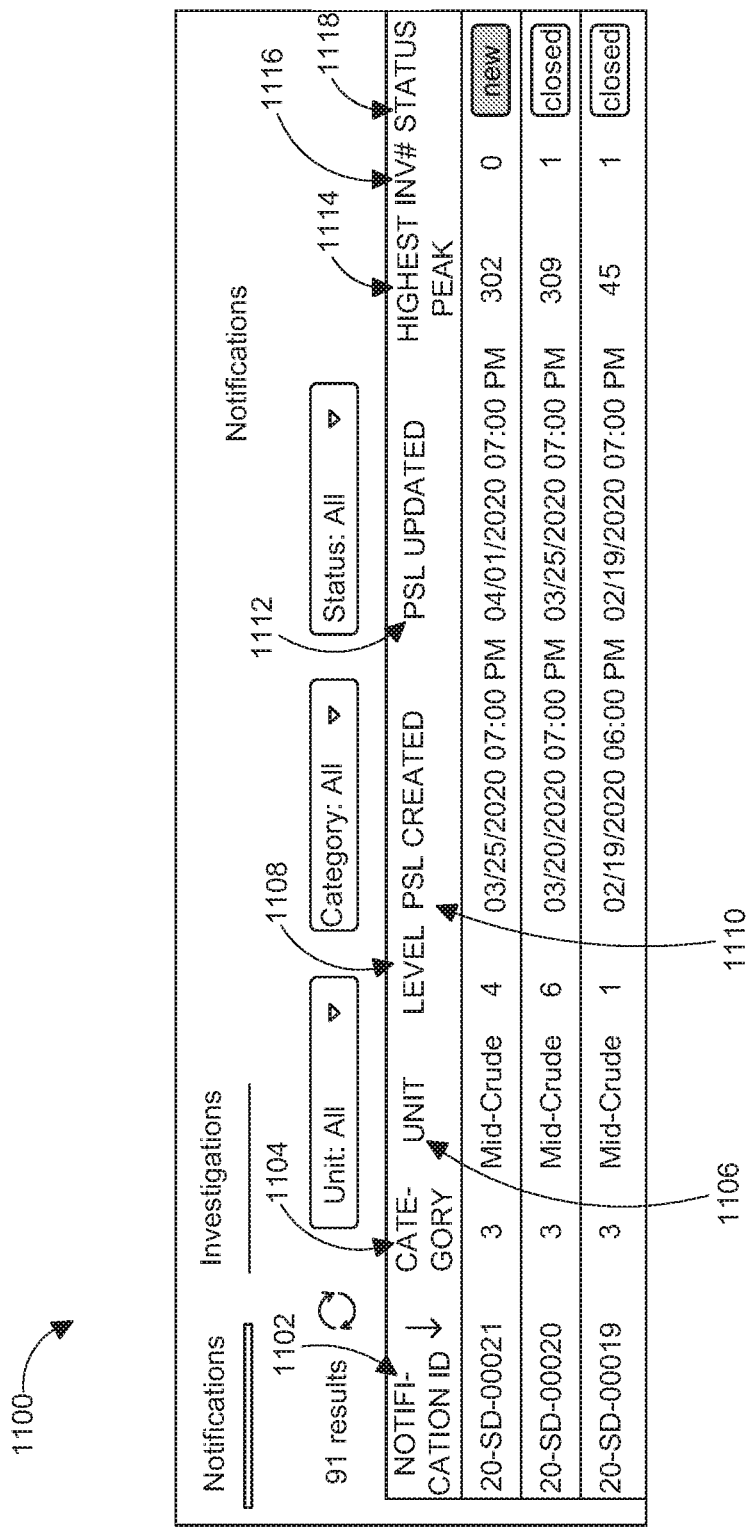
FIG. 7 illustrates an example embodiment of a graphical user interface to provide a notification dashboard indicative of information associated with a PSL.

FIG. 7 illustrates an example embodiment of a graphical user interface to provide a notification dashboard indicative of information associated with a potential leak source. Referring to FIG. 7, a dashboard 1100 of PSLs may be created to document PSL information and status. For example, as illustrated by drop down menu options, information provided via dashboard 1100 may be filtered by one or more parameters, such as, for example, a "Unit", a "Category", and a "Status". As illustrated, when "All" is selected as a filter option for the one or more parameters, ninety-one (91) results may be returned. In some embodiments, the results may be provided in a tabular format, with columns indicating one or more information attributes associated with a PSL, and each row representing a PSL. In some embodiments, the data may be stored in a searchable database. For example, the data may be collected and stored in a database and may be indexed appropriately to enable fast retrievals of data from the database. Also, for example, as values for the one or more information attributes associated with a PSL are updated, the database is also updated accordingly.

In some embodiments, when a new equipment and/or sensor is placed at a facility, the system described herein may be capable of detecting the sensor, and/or updating a sitemap associated with the physical facility to depict the newly detected equipment and/or sensor. Also, for example, the system described herein may be capable of retrieving the one or more information attributes associated with the equipment and/or sensor, creating a new row in dashboard 1100 to represent the newly detected equipment and/or sensor, and populate the columns with the retrieved one or more information attributes. Also, for example, when a new information attribute may be identified, the system described herein may be capable of automatically adding a column associated with the new information attribute, and/or retrieve data associated with the new information attribute from the equipment and/or sensors.

In some embodiments, as displayed on dashboard 1100, PSL notification may be labeled by a serialized notification number 1102 with a current year number. For example, in "20-SD-00021", the numeral "20" may indicate the year 2020, and a system detect identifier "SD-00021." A category 1104 may be indicated by a leak detection level, a unit 1106 may indicate a type of unit (e.g., mid-crude) that the PSL may belong to, elevation level of leak detection 1108 may be indicated by a numeral (meaning which level (or "story") of the facility is the leak detection), a date of creation 1110 of the PSL, a date of last update 1112 of the PSL, a highest peak 1114, an investigation number 1116, and a status 1118. The preceding is just one example of a formatting/nomenclature for a PSL notification, and other PSL notifications may be labeled using one or more other specific formats. For example, a notification may be labeled by a serialized notification number 1102 with a current year number.

Generally, as a source of a potential leak is detected, a status 1118 of the PSL notification may be automatically set to "new." Also, for example, as leak sources are investigated, discovered, and repaired and/or replaced, and upon a determination that there is no further occurrence of a leak detection associated with the PSL, a status 1118 of the PSL notification may be automatically updated to "closed". Referring to FIG. 6, notification label 1006 may provide information associated with a PSL, such as the information displayed in dashboard 1100 of FIG. 7.

Figure 8:
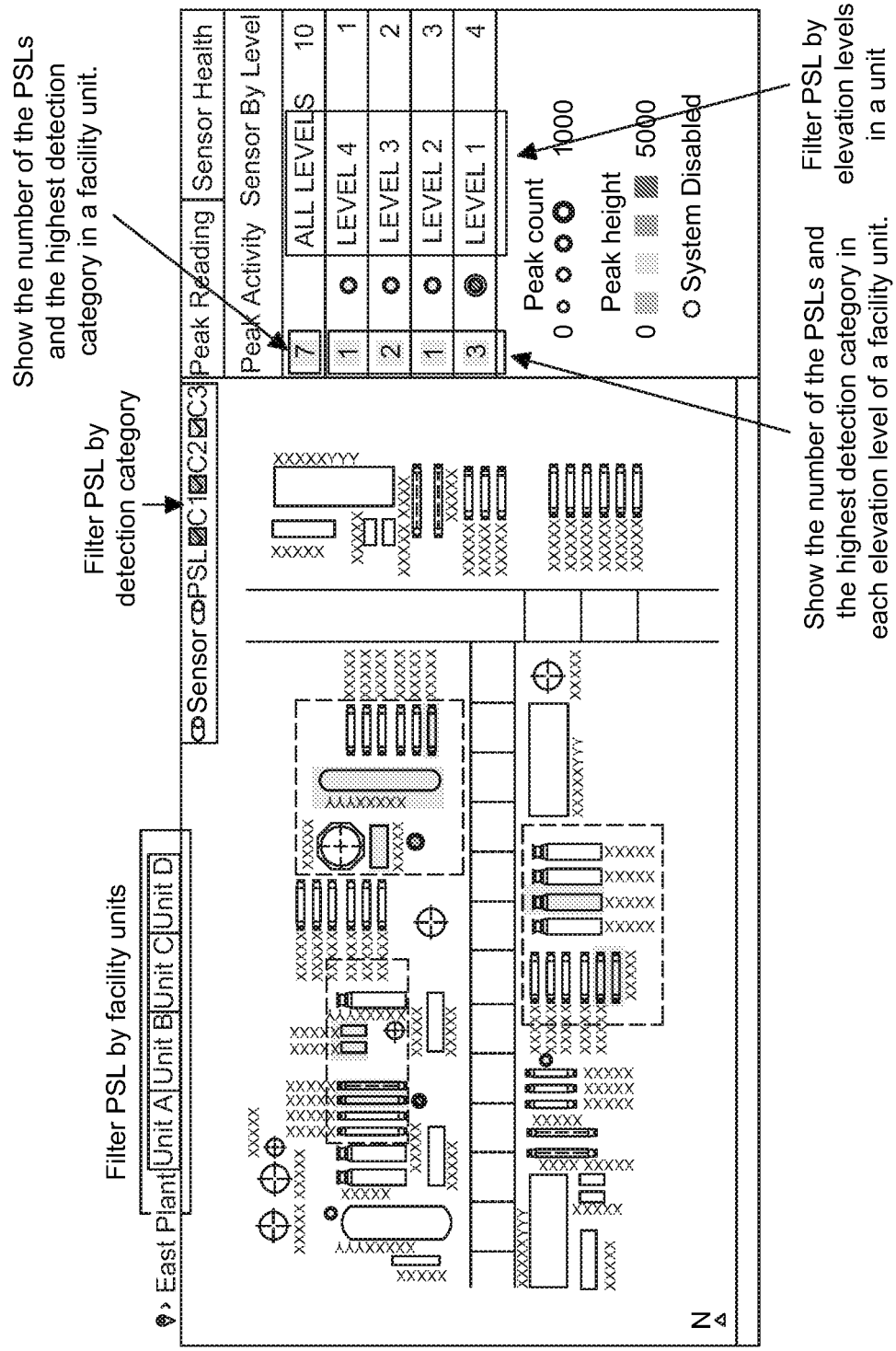
FIG. 8 illustrates an example embodiment of a graphical user interface to provide a searchable visualization of a PSL based on sensor placement within a facility.

FIG. 8 illustrates an example embodiment of a graphical user interface to provide a searchable visualization of a potential leak source location based on sensor placement within a facility. Referring to FIG. 8, PSL display may be filtered by detection category, facility units and elevation levels in a unit. For example, "facility units" such as, for example, "Unit A", "Unit B", "Unit C", and "Unit D" may be represented as selectable tabs, and a user may select the tab corresponding to the unit, and information for the selected unit may be displayed. For example, user may select "Unit A" and information for Unit A of the facility may be provided.

Also, for example, the information may be filtered based on a detection category. For example, the detection categories may be represented by a color scheme, with a first color (e.g., red) represented as "C1", a second color (e.g., orange) represented as "C2", and a third color (e.g., yellow) represented as "C3". Accordingly, user may check a box for "C1" and leave the boxes corresponding to "C2" and "C3" unchecked, and the sitemap may be automatically reconfigured to display PSLs and/or sensors that are only associated with the first color scheme "C1". For example, when "C1" is associated with a red color, then the sitemap may be automatically reconfigured to display PSLs and/or sensors that are only associated with a high level of leak detection.

For example, the information may be filtered based on a number of the PSL and the highest detection category in a facility unit, and the information may be filtered based on a number of PSLs by facility unit or/and by elevation level within a unit provided, with a background color indicative of a detection category associated with the facility unit and/or elevation level. For example, the number of the PSL in a facility unit may be seven (7), and the PSLs within the facility unit may comprise one (1) PSL at Level 4, two (2) PSLs at Level 3, one (1) PSL at Level 2, and three (3) PSLs at Level 1. In another example, a yellow box in Level 1 may indicate that the highest detection category in Level 1 is "3" (e.g., yellow color). This disclosure contemplates variations and combinations of the display of the highest detection category on a graphical user interface of a display screen.

Figure 9:
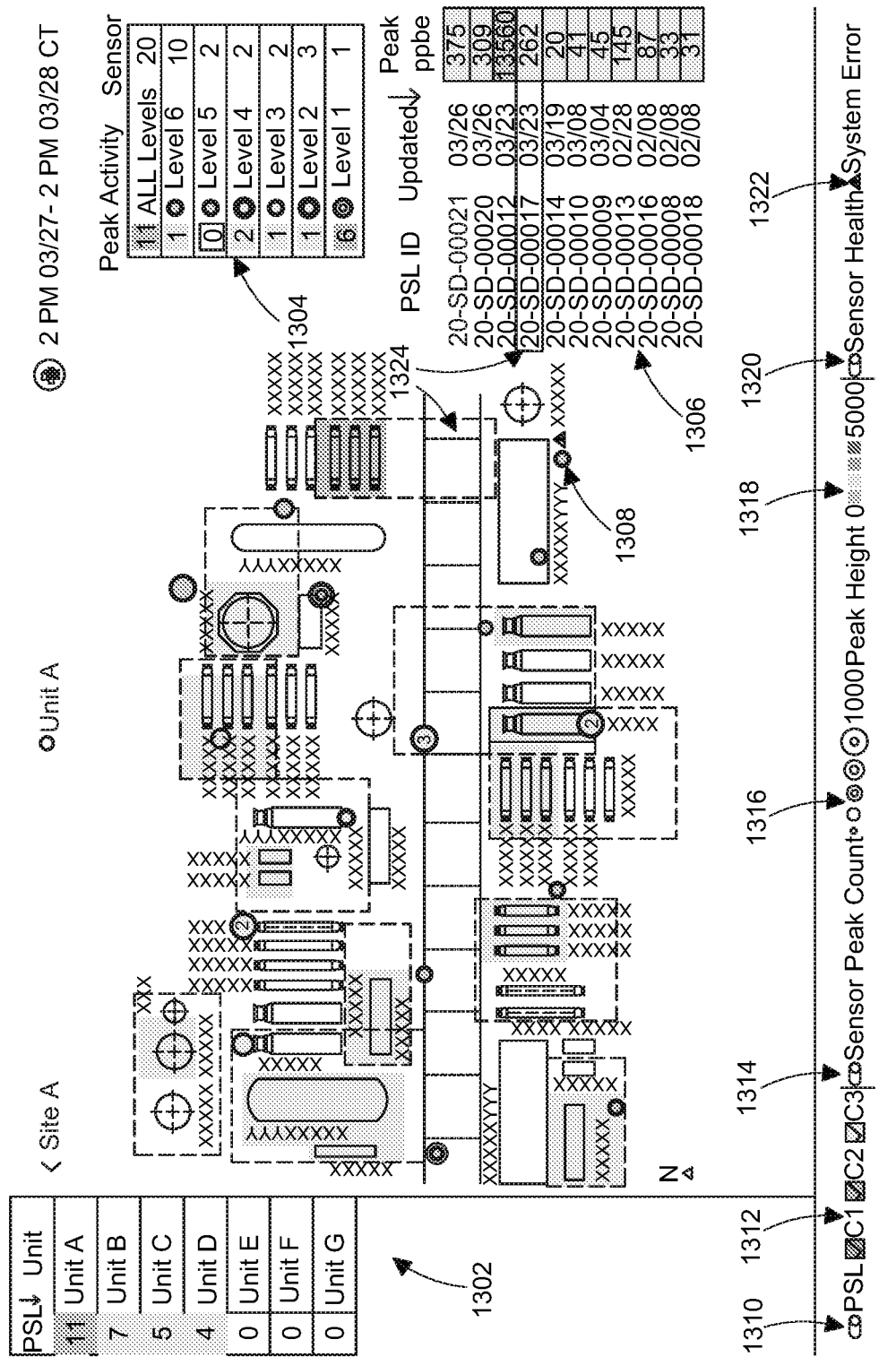
FIG. 9 illustrates an example embodiment of a graphical user interface to provide a unit-level dashboard indicative of information associated with a PSL.

FIG. 9 illustrates an example embodiment of a graphical user interface to provide a unit-level dashboard indicative of information associated with a potential leak source. Referring to FIG. 9, a graphical user interface displaying an example unit-level dashboard 1300 is shown. In some embodiments, one or more legends may be provided via the graphical user interface. For example, a first switch 1310 may be toggled between two positions to indicate if the information is to be provided for PSLs. Likewise, a second switch 1314 may be toggled between two positions to indicate if the information is to be provided for sensors. As indicated, both switches are in an "on" position, indicating that information for both PSLs and sensors may be displayed.

In some embodiments, one or more checkboxes 1312 may be provided to indicate if information may be filtered based on a level of leak detection. For example, checking the box for "C1" may indicate that the information corresponding to the first color in a color scheme (e.g., red) depicting a high level of leak detection may be provided. Likewise, checking the box for "C2" may indicate that the information corresponding to the second color in a color scheme (e.g., orange) depicting a medium level of leak detection may be provided. Also, for example, checking the box for "C3" may indicate that the information corresponding to the third color in a color scheme (e.g., yellow) depicting a low level of leak detection may be provided.

The legend for a color scheme 1318 may be provided. The color scheme 1318 may be an indication of sensor detection level. For example, the peak height of the sensor detection level may be represented by a first color (e.g., red) to indicate a high level, a second color (e.g., orange) to indicate a medium level, a third color (e.g., yellow) represented as low level, and so on. The peak height may be useful to represent visually because a sensor might not constantly detect emissions, but the peak height value may be indicative of persistent leak that warrants consideration. Also, for example, a legend for a peak count 1316, may be illustrated via a number of concentric circles. For example, a lower peak count may be associated with a smaller number of concentric circles, and a higher peak count may be associated with a larger number of concentric circles. The peak count 1316 illustrated in FIG. 9 is one example of a peak count of site facility (e.g., Unit A), and other site facility examples are included in the figures, such as FIG. 4.

Also, for example, a third switch 1320 for sensor health may be provided and may be toggled between the "on" and "off" positions. For example, when third switch 1320 is set to the "on" position, an indication of a health of the sensors may be provided. For example, a hazard sign 1322 may indicate that a sensor has a system failure. For example, as third switch 1320 is set to the "on" position, sensor 1308 on the site map is shown with a hazard next to it, indicating that sensor 1308 has a system error (e.g., loss of communication, loss of power, etc.), thereby indicating to a user of the system that sensor 1308 needs to be investigated to determine the root cause of the error, which may result in repair or replacement of the sensor.

The information may be filtered based on a type of unit. For example, units 1302 may be presented in a tabular format. For example, a unit may be associated with a number of PSLs in the unit. For example, Unit A may include eleven (11) PSLs. In some embodiments, the cell containing the number of PSLs may be color coded with a color scheme as described herein to indicate a highest level of leak detection for the PSLs in the unit. For example, if there is at least one PSL with a high level of activity, the color may correspond to red. However, if there are no PSLs with a high level of activity, and all PSLs show a low to medium level of activity, the color may correspond to orange, indicating a medium level of leak detection as the highest level of activity. For example, the cell containing the number "11" may be color coded with orange, indicating a medium level of leak detection as the highest detection level for the PSLs in Unit A. Also, for example, the cell containing the number "7" may be color coded with yellow, indicating a low level of leak detection for the seven (7) PSLs in Unit B. Similarly, the cells containing the numbers "5" and "4" may be color coded with yellow, indicating low levels of detection for the five (5) PSLs in Unit C, and the four (4) PSLs in Unit D, respectively. Also, for example, Units E, F, and G, have no peak activity for the PSLs in those units, thus showing "0" in the corresponding cells.

A user may select a tab corresponding to a unit in the units 1302. For example, when a tab associated with Unit A is selected, information associated with Unit A may be displayed via unit-level dashboard 1300. In some embodiments, a second table 1304 may provide information related to peak activity of PSLs of the selected unit as reported by the sensors. The top row of the second table 1304 indicates, for example, that twenty (20) sensors in Unit A are reporting data, across all levels of leak detection, and a total of 11 PSLs may be observed. The last row of second table 1304 indicates that six (6) PSLs in Level 1 report a medium level of leak detection, as indicated by the numbers in a color (e.g., orange). The remaining rows of the second table 1304 indicate that the PSLs report a low level of leak detection, as indicated by the numbers in a different color gradient or color (e.g., yellow) for Levels 2, 3, 4 and 6, or in yet another color (e.g., off white) for Level 5 (meaning no significant detection). Accordingly, the highest level of peak activity of the PSLs in Unit A may be determined to be medium and indicated by a darker color (e.g., orange) or another color. Accordingly, the total number "11" may also be presented in a cell that is filled in with the color orange, in one illustrative embodiment.

As may be noted, the number "11" in the top row of second table 1304 is identical to that displayed next to Unit A in first table 1302. Second table provides further insight into the peak activity levels in Unit A by providing a break down by a level of activity of the eleven (11) PSLs as reported by the twenty (20) sensors. For example, one (1) PSL may indicate a low (e.g. yellow) level of leak detection, as reported by ten (10) sensors at Level 6; zero (0) PSLs indicate no significant detection, as reported by two (2) sensors at Level 5; two (2) PSLs may indicate a low (e.g. yellow) level of leak detection, as reported by two (2) sensors at Level 4; one (1) PSL may indicate a low (e.g. yellow) level of leak detection, as reported by two (2) sensors at Level 4; one (1) PSL may indicate a low (e.g., yellow) level of leak detection, as reported by two (2) sensors at Level 3; one (1) PSL may indicate a low (e.g. yellow) level of leak detection, as reported by three (3) sensors at Level 2; and six (6) PSLs may indicate a medium (e.g. orange) level of leak detection, as reported by one (1) sensor at Level 1. As indicated, the number of sensors add up to twenty (20). Also, for example, as described with respect to legend 1316, a peak count corresponding to the peak activity level may be indicated by a number of concentric circles.

In some embodiments, a third table 1306 may be provided, where third table 1306 may provide more detailed information about the PSLs in the selected unit. For example, as illustrated, third table 1306 provides more detailed information about the eleven (11) PSLs in Unit A. For example, a first column indicates a PSL identifier ("ID"), the second column may indicate the date of the last update for the PSL, and the third column may indicate the sensor highest detection peak in ppbe ("parts per billion equivalent") for the PSL on the date of the last update. For example, the information for PSL with ID 20-SD-00012 is shown to have been last updated on March 23, with a reported sensor highest detection of 13,560 ppbs. Accordingly, PSL with ID 20-SD-00012 is colored (e.g., in orange in some examples) and label 1324 indicates the PSL on the sitemap associated with the corresponding row in third table 1306.

Figure 10:
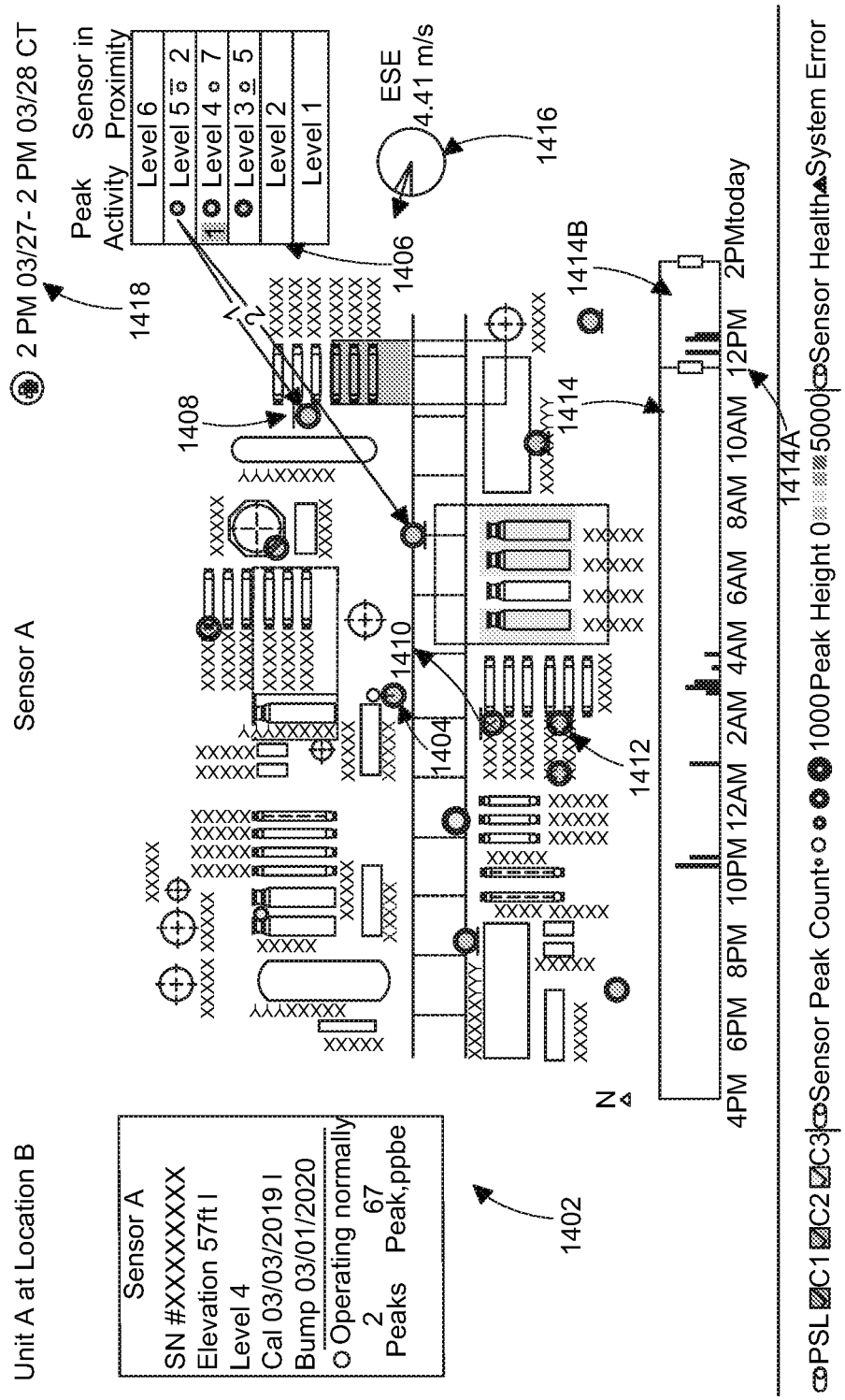
FIG. 10 illustrates an example embodiment of a graphical user interface to provide a sensor-level dashboard indicative of information associated with a PSL.

FIG. 10 illustrates an example embodiment of a graphical user interface to provide a sensor-level dashboard indicative of information associated with a potential leak source. Referring to FIG. 10, a sensor-level dashboard 1400 may provide information associated with a sensor. For example, a site map of a facility is illustrated. One or more legends, checkboxes, and/or toggle switches at the bottom of sensor-level dashboard 1400 may provide similar functionality as those described with respect to FIG. 9. Information for a sensor, say Sensor A, for a unit, say Unit A, at a physical location, say Location B, may be provided. A physical location 1404 of Sensor A on the site map may be provided, indicated by a virtual pin on the circle representing Sensor A.

Notification label 1402 may provide a name of the sensor, a sensor identifier, an elevation of a physical location of the sensor, a date of last calibration, and a date of an update. In some embodiments, notification label 1402 may provide a health of the sensor (e.g., operating normally, has a system failure, needs to be calibrated, and so forth). Also, for example, a number of peaks is provided (e.g., "2"), with a measurement of the highest peak (e.g., "67 ppbe").

A table 1406 may provide information related to a peak activity, a level, and a number of sensors that are proximate to Sensor A. For example, thirteen (13) sensors are shown to be proximate to Sensor A (thus totaling fourteen (14) sensors), with two (2) sensors at Level 5, seven (7) sensors at Level 4 (of which Sensor A is one of the seven (7)), and five (5) sensors at Level 3. As shown, the two (2) sensors at Level 5 are depicted with an overlined circle, and may correspond to sensor 1408 and sensor 1410 on the site map. An association between the row in table 1406 and the two sensors, sensor 1408 and sensor 1410, is illustrated by arrows 1 and 2. Also, for example, the five (5) sensors at Level 3 may be depicted with an underlined circle, such as for example, sensor 1412 on the site map. As another example, the seven (7) sensors at Level 4 may be depicted as circles (without any overlining or underlining), such as, for example, sensor 1404.

In some embodiments, a timeline 1414 may illustrate peak activity levels for Sensor A. For example, an interval of time 1414A may be selected (e.g., 12 PM-2 PM), the corresponding portion 1414B of timeline 1414 may be highlighted, and sensor-level dashboard 1400 may provide information from the corresponding interval of time. In some embodiments, one or more types of measurement for Sensor A may be provided.

In some embodiments, a wind indicator 1416 shows the dominant wind direction and the average wind velocity during a time window 1418.

Figure 11:
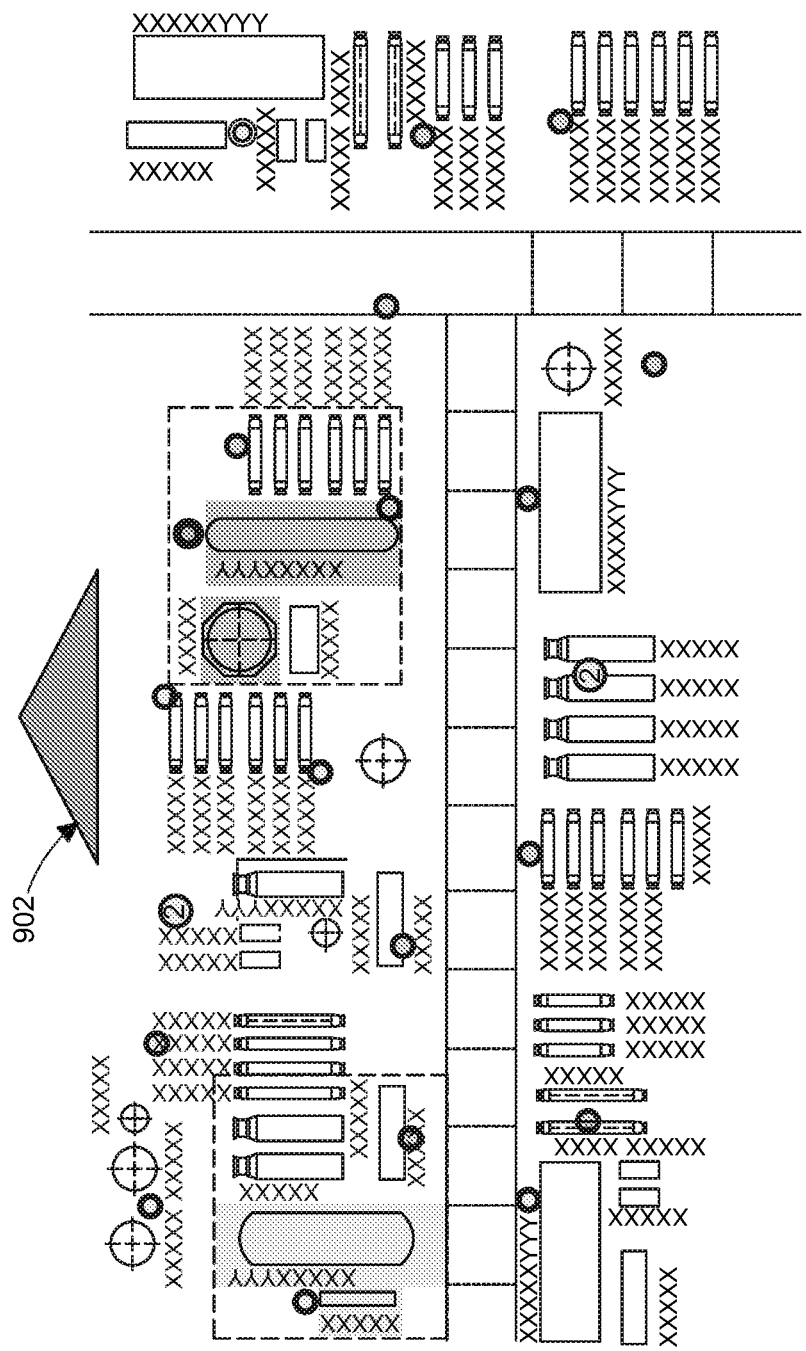
FIG. 11 illustrates an example embodiment of a graphical user interface to provide a notification indicative of sensor measurements from an external PSL.

FIG. 11 illustrates an example embodiment of a graphical user interface to provide a notification indicative of sensor measurements from an external potential source location (PSL) of leaks. Emissions may come from both/either inside and/or outside of a unit. For example, a catastrophic failure may take place in a nearby petrochemical facility causing large emission of toxic or harmful gases or vapors (e.g., hydrogen sulfide, butadiene, or other gases) and these gases can travel hundreds of feet to several miles downwind. The gas plumes can trigger detection notifications just as can gas plumes generated inside, and these notifications, particularly notifications of high level detections (e.g. Category 1), can assist in protecting personnel at the industrial facility. On the graphical user interface of the site map/industrial facility, an outside-of-unit PSL 902 may be displayed at an appropriate edge of the unit with a triangle (or other shape) pointing to the direction of the leak source. In FIG. 11, a colored (e.g., red) triangle 902 is showed on the north side of the unit suggesting a potential source location of Category 1 detection to the North of the unit. In the graphical user interface, a user click/selection on the triangle 902 may show detailed information including but not limited to notification ID, date and time of the event, detection levels, and/or proximate distance of the PSL from the unit. In some embodiments, a triangle may be displayed at one of the four corners when the source location is determined to be outside of the unit and in one of the corner/diagonal directions. Just as inside unit PSLs, an outside-of-unit PSL 902 can be investigated and the results of investigation properly documented before closing.

Figure 12:
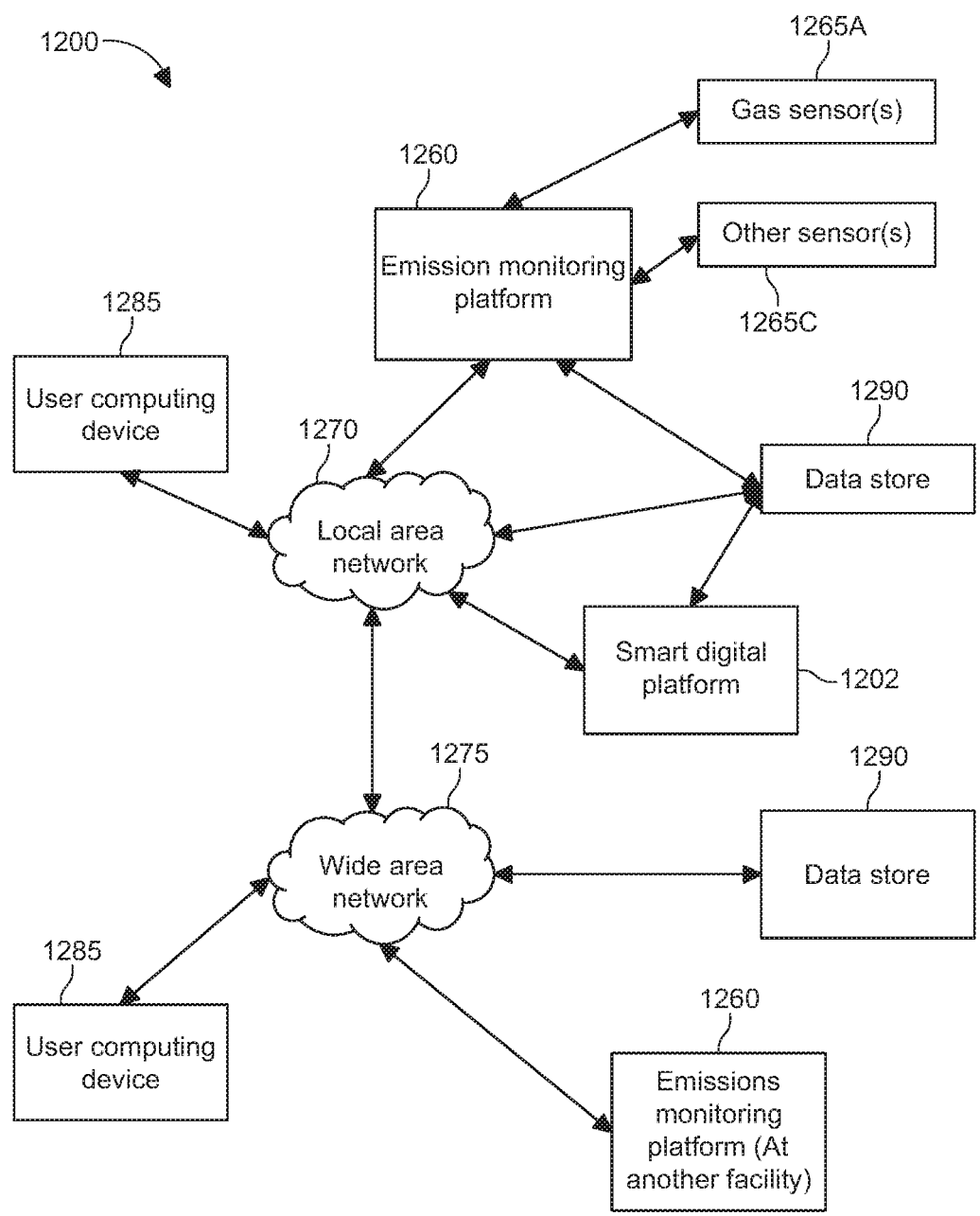
FIG. 12 illustrates an example embodiment a block diagram of a sensor network-based emissions monitoring system, in accordance with various aspects of the disclosure.

FIG. 12 illustrates an example embodiment a block diagram of a sensor network-based emissions monitoring system 1200, in accordance with various aspects of the disclosure. The disclosure is not limited to just the combination of elements depicted in FIG. 12; rather, numerous variations of the sensor network-based emissions monitoring system are contemplated by the method steps, apparatus components, system interactions, and other aspects disclosed herein. For example, the emissions monitoring platform 1260 may be communicatively coupled with one or more sensors, such as gas sensor(s) 1265A, wind sensors, and/or one or more other sensors 1265C such as a GPS location sensor. In one example, one transmitter may carry multiple sensors of one or more types. For example, a single sensory assembly may comprise multiple sensors of one or more types. In another example, a networked sensor may comprise multiple sensors of more than one type. The sensors may operate to collect measurements in near real-time for input to the emissions monitoring platform 1260.

The emissions monitoring system of FIG. 12 includes block diagrams of numerous platforms and devices that are further elaborated in this disclosure. FIG. 12 is an illustrative emissions monitoring system with one or more processing apparatuses, such as a smart digital computer platform 1202, to implement the methods and functions of certain aspects of the present disclosure. The processing apparatuses may include general-purpose microprocessors and/or special-purpose processors designed for particular computing system environments or configurations. For example, the processors may execute computer-executable instructions in the form of software and/or firmware stored in the memory of the platform or device. Examples of well-known computing systems, environments, and/or configurations that may be suitable for use with the disclosed embodiments include, but are not limited to, personal computers (PCs), server computers, hand-held or laptop devices, smart phones, multi-processor systems, microprocessor-based systems, programmable consumer electronics, network PCs, minicomputers, mainframe computers, distributed computing environments that include any of the above systems or devices, and the like.

In addition, the platform and/or apparatuses in FIG. 12 may comprise one or more memories, such as any of a variety of computer-readable media. Examples of computer-readable media may include tangible computer memory accessible to an emissions monitoring platform 1260. The memory may be non-transitory, volatile or nonvolatile, and/or removable and non-removable media implemented in any method or technology for storage of information, such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by emission monitoring platform 1260. The memories may further include data store 1290 in the platform and may further store modules that may include compiled software code that causes the platform, device, and/or overall system to operate in a technologically improved manner as disclosed herein. For example, the data store 1290 may store software used by a computing platform, such as operating system, application programs, and/or associated database.

Furthermore, the devices in FIG. 12 may include one or more communication interfaces including, but not limited to, a microphone, keypad, touch screen, and/or stylus through which a user of a computer (e.g., remote alert device 1285) may provide input, and may also include a speaker for providing audio output and a video display device for providing textual, audiovisual and/or graphical output. The communication interfaces may include a network controller for electronically communicating (e.g., wirelessly or wired) over a public network 1275 or a private network 1270 with one or more other components on the network. The network controller may include electronic hardware for communicating over network protocols, including TCP/IP, UDP, Ethernet, and/or other protocols. In some examples, the emissions monitoring platform 1260 may be a cloud-based device that operates remote from the facility over a computer network.

A remote alert device 1285 may comprise a processor, a memory, and/or a communication interface. The processor may process and analyze the data stored in the memory. In some embodiments, the memory may store computer-executable instructions that, when executed by the processor, cause a remote alert device 1285 to perform one or more of the steps disclosed herein. As explained herein, in one example, the remote alert device 1285 may receive data from the emissions monitoring platform 1260 and display a graphical user interface (GUI) on the remote alert device 1285 to enable a user to view emissions reports.

In some embodiments, the system may generate alerts based on values received through the communications interface. The values may indicate that a dangerous gas leak has been detected in the facility due to anomalous sensor readings. The detection event may cause adjustment of one or more operating parameters of the facility. As a result of adjustment of the operating parameters, the facility may cause adjustments or halting/starting of one or more operations. In an alternative embodiment, the commands may be directly communicated, either wirelessly or in a wired fashion, to physical components at the facility such that the physical components include an interface to receive the commands and execute them.

Although FIG. 12 is not so limited, in some embodiments the remote alert device 1285 may include a desktop computer, a smartphone, a wireless device, a tablet computer, a laptop computer, and/or the like. The remote alert device 1285 may be physically located locally or remotely, and may be connected by one or more communications links to one or more other devices in the system.

Although the elements of FIG. 12 are illustrated as logical block diagrams, the disclosure is not so limited. In particular, one or more of the representative boxes in FIG. 12 may be combined into a single box or the functionality performed by a single box may be divided across multiple existing or new representative boxes. Moreover, some boxes that are visually presented as being inside of another box may be moved such that they are partially or completely residing outside of that box. For example, FIG. 12 contemplates that data store 1290 may be stored inside a firewall (e.g., internal to LAN 1270) or stored on a publicly accessible network 1275 to facilitate sharing between multiple facilities, in some examples.

Furthermore, the data stores 1290 from multiple plant locations may be shared and holistically analyzed to identify one or more trends and/or patterns in the operation and behavior of the facility and/or components. In such a crowd-sourcing-type example, a distributed database arrangement may be provided where a database (e.g., data store) may simply serve as an interface through which multiple, separate data stores may be accessed. As such, a system may access the database to analyze data collected by various sensors. In another example, the data values from a database from each facility may be combined and/or collated into a single database using which emissions monitoring platforms may perform various calculations.

As may be noted, the arrangement of legends, notification labels, tabs, icons, selectable objects, tables, and so forth illustrated in the figures herein are for illustrative purposes only. Additional, and/or alternative arrangements are contemplated, and are all within the scope of this disclosure.

In some aspects, a method may comprise generating a visual representation of a physical facility comprising one or more PSLs and one or more physical sensors. Then the method may determine one or more characteristics of the one or more PSLs and the one or more physical sensors. Subsequently, the method may retrieve, from the one or more PSLs and the one or more sensors, a level of leak detection. Then, the method may associate the level of leak detection with a visual representation indicative of the level of leak detection. Subsequently, the method may configure an interactive graphical user interface that may provide the site map, and based on a user selection of filters associated with the one or more characteristics of the one or more PSLs and the one or more physical sensors, the method may cause the graphical user interface to display the information based on the selected filters.

This disclosure describes numerous embodiments involving a sensor network-based emission monitoring system, which includes a smart digital platform. The system collectively collects, filters, analyzes, transforms, translates, and/or renders appropriate information identified by a sensor network-based emissions monitoring system in a facility susceptible to fugitive emissions. The sensor network-based emissions monitoring system may include a plurality of sensors positioned at desired locations throughout the facility. In an embodiment, the specific location/orientation of each sensor is readily known/ascertainable. If desired, the sensors may all comprise the same type of sensor or the sensors may comprise different types of sensors, either with different sensitivities generally or with different performance under certain conditions. Certain sensors, for example, might be more sensitive to certain chemicals than other chemicals. By having a mix of sensors, a more complete sensor system can be provided. The sensors can be configured to provide feedback to the system generally continuously, on predetermined intervals, or when predetermined events take place (or some or all). In some facilities, more than one gaseous material and other materials may be transported simultaneously and/or side-by-side. For example, a facility may have parallel pipes transporting $CH_4$ gas in one pipe and $C_9H_{20}$ gas in another pipe. The system disclosed herein may use the same networked sensor to distinguish between a possible $CH_4$ gas leak and a $C_9H_{20}$ gas leak, thus more optimally locate the source of a leak. For example, if a sensor (or networked grid of sensors) outputs measurement, the system may incorporate that knowledge into identifying a pipe transporting $C_9H_{20}$ gas instead of a pipe transporting $CH_4$ gas. Although several examples herein reference wind speed, other external, environmental factors may serve to fine tune the emissions monitoring apparatus. The system can also be provided environmental information such as temperature, wind speed, humidity, pressure, etc. More specifically, the disclosure describes one or more methods used by the system, which includes the smart digital platform, to collect, filter, analyze, transform, translate, and/or render the collected monitoring data into a visual output that is capable of being rendered on a graphical user interface (GUI) on a screen display with, in some embodiments, a restricted form factor (e.g., a smartphone screen, a mobile tablet screen, or other mobile device screen). For example, smart analytics may be used to cull, filter, and/or transform the data displayed in a pop-up dialog box on a GUI. In another example, the transformed data may be translated into a visual, graphical element that conveys an abundance of appropriate, tailored information to a particular type of user viewing the GUI. A smart digital platform, such as a dashboard, is disclosed herein to manage data, including sensor performance data, sensor detection signal and results from analysis such as PSL locations, and data of leaks found related to the PSL notifications. one embodiment, a system/platform is disclosed to more easily manage data through a visual, easy-to-navigate platform. Further detailed information regarding the detection zones of a sensor in a facility with a sensor network-based emission monitoring system, 2-dimensional and/or 3-dimensional digital representations of the facility, and generated LDAR zones may be found in International Patent Application Serial No. PCT/US20/34115, filed May 22, 2020, entitled "Systems and Methods for Placing Networked Sensors within a Facility for Fugitive Emissions Monitoring," which claims the benefit of priority to U.S. Provisional Patent Application Ser. No. 62/851,120, filed May 22, 2019, entitled "Method of Placing Sensors Within a Facility for Fugitive Emissions Monitoring," both of which are herein incorporated by reference in their entireties.

While particular embodiments are illustrated in and described with respect to the drawings, it is envisioned that those skilled in the art after review of the entirety disclosed herein may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims. It is to be understood that other embodiments may be utilized and structural and functional modifications may be made without departing from the scope described herein. Further, the foregoing descriptions describe methods that recite the performance of a number of steps. Unless stated to the contrary, one or more steps within a method may not be required, one or more steps may be performed in a different order than as described, and one or more steps may be formed substantially contemporaneously. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. In addition, although several examples involve the transport of gaseous materials across a distance, the disclosure is not so limited. Rather, chemicals or other forms of VOCs and/or HAPs that are transported across a distance may serve as replacements for gas—for example, the facility/plant may transport chemical liquids/materials that, when leaked, cause a gaseous plume to form.

We claim:

1. A smart digital computer platform comprising:
    a computer display configured to render a graphical user interface of an industrial facility;
    a data store configured to store archived data corresponding to plant operation of the industrial facility, wherein the plant operation comprises a gas stream associated with gas plume detections in time intervals;
    a communications interface communicatively coupled to a remote alert device;
    at least one computer processor; and
    a non-transitory computer-readable memory storing computer-readable instructions that, when executed by the at least one computer processor, cause the smart digital computer platform to:
        post-process the archived data in the data store to cull the archived data outside of a first time interval of plant operation of the industrial facility;
        translate the post-processed, archived data corresponding to the first time interval to render one or more potential source locations (PSLs) on the graphical user interface of the industrial facility;
        generate graphical icons to display on the graphical user interface of the industrial facility;
        color-code one or more portions of the graphical user interface of the industrial facility corresponding to the one or more PSLs;
        generate a user-interactive dashboard on the graphical user interface configurable to change the first time interval to another time interval; and
        send an alert notification, through the communications interface, to the remote alert device to indicate a gas plume detection at the first time interval at the one or more PSLs of the industrial facility.

2. The smart digital computer platform of claim 1, wherein the user-interactive dashboard on the graphical user interface comprises a timeline graphic with a selectable time interval from the time intervals associated with the gas plume detections.

3. The smart digital computer platform of claim 1, wherein the non-transitory computer-readable memory further stores computer-readable instructions that, when executed by the at least one computer processor, cause the smart digital computer platform to:
    filter the post-processed, archived data to desired operating parameters of the industrial facility;
    generate a pop-up box overlaying the graphical user interface of the industrial facility, wherein the pop-up box displays a highest peak value and a detection category value.

4. The smart digital computer platform of claim 1, wherein the user-interactive dashboard on the graphical user interface comprises a sensor health toggle button indicating health of one or more sensors at the industrial facility, and wherein the non-transitory computer-readable memory further stores computer-readable instructions that, when executed by the at least one computer processor, cause the smart digital computer platform to:
    generate a hazard sign on the graphical user interface near the one or more sensors with a system error.

5. The smart digital computer platform of claim 1, wherein the color-coding of the one or more portions of the graphical user interface comprises:
    color-coding one or more components of the industrial facility with a color scheme corresponding to a detection category, wherein the detection category is indicative of a level of severity detected by one or more sensors at the industrial facility.

6. The smart digital computer platform of claim 5, wherein the user-interactive dashboard on the graphical user interface comprises a sensor-level dashboard comprising selectable checkboxes configured to filter the graphical user interface based on the detection category.

7. The smart digital computer platform of claim 1, wherein the user-interactive dashboard on the graphical user interface comprises a unit-level dashboard comprising selectable graphics configured to filter the graphical user interface.

8. The smart digital computer platform of claim 1, wherein the user-interactive dashboard generated on the graphical user interface is configured based on a user profile of the remote alert device, and wherein the remote alert device comprises the computer display rendering the graphical user interface.

9. The smart digital computer platform of claim 1, wherein the graphical user interface comprises a selectable unit of the industrial facility, and wherein the graphical user interface filters the graphical icons and the color-coded portions displayed on the graphical user interface based on the selected unit, and wherein the remote alert device comprises the computer display rendering the graphical user interface.

10. The smart digital computer platform of claim 1, wherein the remote alert device is configured to automatically adjust one or more operating parameters of the plant operation in response to receiving the alert notification, and wherein the user-interactive dashboard on the graphical user interface comprises an interface to enable a user to enter desired operating parameters.

11. A method comprising:
receiving, from a data store, archived data corresponding to plant operation associated with gas plume detections in time intervals;
for the archived data:
post-processing, by a computer processor, the archived data in the data store to cull the archived data outside of a first time interval of the plant operation of an industrial facility; and
translating, by the computer processor, the post-processed, archived data corresponding to the first time interval to render one or more potential source locations (PSLs) on a graphical user interface;
generating graphical icons to display on the graphical user interface of the industrial facility;
color-coding one or more portions of the graphical user interface of the industrial facility corresponding to the one or more PSLs;
generating a user-interactive dashboard on the graphical user interface configurable to change the first time interval to another time interval;
generating on the user-interactive dashboard on the graphical user interface a sensor health toggle button indicating health of one or more sensors at the industrial facility;
generating a hazard sign on the graphical user interface near the one or more sensors with a system error when the sensor health toggle button is set to ON; and
sending, by the computer processor, an alert notification, to a remote alert device to indicate a gas plume detection at the first time interval at the one or more PSLs of the industrial facility.

12. The method of claim 11, further comprising:
generating a timeline graphic on the user-interactive dashboard on the graphical user interface, wherein the timeline graphic is configured to receive selection of a time interval from the time intervals associated with the gas plume detections.

13. The method of claim 11, further comprising:
filtering the post-processed, archived data to desired operating parameters of the industrial facility; and
generating a pop-up box overlaying the graphical user interface of the industrial facility.

14. The method of claim 13, wherein the pop-up box displays a highest peak value and a detection category value.

15. The method of claim 11, wherein the color-coding of the one or more portions of the graphical user interface comprises:
color-coding one or more components of the industrial facility with a color scheme corresponding to a detection category, wherein the detection category is indicative of a level of severity detected by one or more sensors at the industrial facility.

16. The method of claim 11, wherein the generating the user-interactive dashboard on the graphical user interface comprises:
generating a sensor-level dashboard comprising selectable checkboxes configured to filter the graphical user interface based on a detection category.

17. The method of claim 11, wherein the remote alert device comprises a computer display rendering the graphical user interface, and the method further comprising:
adjusting, by the remote alert device, one or more operating parameters of the plant operation in response to receiving the alert notification.

18. A non-transitory computer readable medium storing instructions that, when executed by a computer processor, cause:
receiving, from a data store, archived data corresponding to plant operation associated with gas plume detections in an industrial facility;
post-processing the archived data in the data store;
translating the post-processed, archived data to render one or more potential source locations (PSLs) on a graphical user interface;
generating graphical icons to display on a user-interactive dashboard on the graphical user interface of the industrial facility;
color-coding one or more portions of the graphical user interface of the industrial facility corresponding to the one or more PSLs;
generating on the user-interactive dashboard on the graphical user interface a sensor health toggle button indicating health of one or more sensors at the industrial facility;
generating a hazard sign on the graphical user interface near the one or more sensors with a system error when the sensor health toggle button is set to ON; and
sending an alert notification to a remote alert device to indicate a gas plume detection at the one or more PSLs of the industrial facility.

19. The non-transitory computer readable medium of claim 18, further storing instructions that, when executed by the computer processor, cause:
generating a pop-up box overlaying the graphical user interface of the industrial facility, wherein the pop-up box displays a highest peak value and a detection category value; and
adjusting, by the remote alert device, one or more operating parameters of the plant operation in response to receiving the alert notification.

* * * * *